US008565154B2

(12) United States Patent
Ji et al.

(10) Patent No.: US 8,565,154 B2
(45) Date of Patent: Oct. 22, 2013

(54) CELL RESELECTION ENHANCEMENT

(75) Inventors: Tingfang Ji, San Diego, CA (US); Peter Gaal, San Diego, CA (US); Rajat Prakash, La Jolla, CA (US); Ozgur Dural, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 12/941,505

(22) Filed: Nov. 8, 2010

(65) Prior Publication Data

US 2011/0110254 A1 May 12, 2011

Related U.S. Application Data

(60) Provisional application No. 61/259,562, filed on Nov. 9, 2009.

(51) Int. Cl.
*H04W 4/00* (2009.01)

(52) U.S. Cl.
USPC ........................................ 370/328; 455/422.1

(58) Field of Classification Search
None
See application file for complete search history.

(56) References Cited

U.S. PATENT DOCUMENTS

| 2005/0075125 A1* | 4/2005 | Bada et al. ..................... 455/525 |
| 2008/0268878 A1* | 10/2008 | Wang et al. ..................... 455/458 |
| 2011/0130099 A1* | 6/2011 | Madan et al. ................ 455/63.1 |

FOREIGN PATENT DOCUMENTS

WO    WO2009001269 A2    12/2008

OTHER PUBLICATIONS

3rd Generation Partnership Project; Technical Specification Group Radio Access Network; Evolved Universal Terrestrial Radio Access (E-UTRA); Physical layer—Measurements (3GPP TS 36.214 version 8.7.0 Release 8), Technical Specification, European Telecommunications Standards Institute (ETSI), 650, Route Des Lucioles ; F-06921 Sophia-Antipolis ; France, Sep. 30, 2009, pp. 1-12, XP002619832, Retrieved from the Internet: URL:www.3gpp.org [retrieved on Feb. 2, 2011].
International Search Report and Written Opinion—PCT/US2010/056085—ISA/EPO—Jun. 10, 2011.
Universal Mobile Telecommunications System (UMTS); User Equipment (UE) procedures in idle mode and procedures for cell reselection in connected mode (3GPP TS 25.304 version 8.6.0 Release 8), Technical Specification, European Telecommunications Standards Institute (ETSI), 650, Route Des Lucioles ; F-06921 Sophia-Antipolis ; France, No. V8.6.0, Jul. 1, 2009, XP014044607.

(Continued)

*Primary Examiner* — Jianye Wu
(74) *Attorney, Agent, or Firm* — John J. Ketchum

(57) ABSTRACT

Methods and apparatuses are provided that facilitate measuring frequencies for cell reselection. A base station providing a cell can be interfered by one or more closed subscriber group (CSG) cells over at least a portion of frequency utilized by the base station to serve one or more devices. The base station can determine and provide one or more parameters related to performing a measurement of a system bandwidth to one or more devices that are within range of the one or more CSG cells that includes at least a portion of the bandwidth utilized by the one or more CSG cells. The one or more devices can accordingly perform measurements of the system bandwidth of the base station for determining one or more communication metrics related to performing reselection and/or measuring other frequencies for reselection. The measurement can relate to a wideband measurement, a plurality of narrowband measurements, etc.

18 Claims, 16 Drawing Sheets

(56) References Cited

OTHER PUBLICATIONS

LTE; Evolved Universal Terrestrial Radio Access (E-UTRA); Radio Resource Control (RRC); Protocol specification (3GPP TS 36.331 version 8.6.0 Release 8), Technical Specification, European Telecommunications Standards Institute (ETSI), 650, Route Des Lucioles ; F-06921 Sophia-Antipolis ; France, No. V8.6.0, Jul. 1, 2009, XP014044759.

Nokia et al: "Neighbor List Considerations", [Online] vol. R2-071759, No. 58, May 7, 2007, pp. 1-4, XP002506211, Retrieved from the Internet: URL:http://www.3gpp.org/ftp/tsg_ran/WG2_RL2/TSGR2_58/Documents/> [retrieved on Dec. 1, 2008].

* cited by examiner

CELL RESELECTION ENHANCEMENT

CLAIM OF PRIORITY UNDER 35 U.S.C. §119

The present application for patent claims priority to Provisional Application No. 61/259,562 entitled "CELL RESELECTION ENHANCEMENT METHODS," filed Nov. 9, 2009, and assigned to the assignee hereof and hereby expressly incorporated by reference herein.

BACKGROUND

1. Field

The following description relates generally to wireless communications, and more particularly to reselecting cells for communicating in wireless networks.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Moreover, for example, a wireless network can include multiple types of base stations that implement different coverage cells. For example, a base station can provide macrocell coverage, closed subscriber group (CSG) or other femtocell coverage in heterogeneous deployments, and/or the like. In one deployment of a wireless network, macrocells and CSG cells are deployed on a high priority frequency, such that co-channel interference is possible, and the macrocell can have one or more co-located deployments at lower priority frequencies. In addition, devices can perform cell reselection among one or more cells of one or more base stations to maintain connection to a wireless network where communications properties in a current cell become undesirable. In one example, the device can perform a narrowband measurement over the center of the system bandwidth (e.g., over the center six resource blocks, or about 1.08 megahertz) utilized by one or more cells to determine a reference signal received power (RSRP) for discerning whether to perform reselection to one or more other cells.

Where a CSG cell that does not allow communications from the device interferes with the current cell, however, measuring RSRP does not consider such interference, and thus the device continues to communicate with the current cell though the downlink channel quality is inhibited by the CSG cell. In this regard, for example, the RSRP of a current cell can be compared to that of the CSG cell, and if they differ by at least a threshold level, the device can evaluate other frequencies for reselection. In another example, signal-to-interference-and-noise ratio (SINR) or reference signal received quality (RSRQ) can be measured, or otherwise computed, and used to determine whether to perform reselection and/or whether to evaluate other frequencies as well. In one deployment, however, base stations can be offset from the center frequency of the system bandwidth such that partial co-channel interference is possible. Measuring the RSRQ in the narrowband center of the system bandwidth, for example, may not include the interference, and thus may result in RSRQ above the threshold level for evaluating other frequencies (e.g., where the partial co-channel interference exists outside of the narrowband).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with determining to evaluate other frequencies for measuring and/or reselecting to one or more cells. In an example, a measurement bandwidth can be defined and received at a device for measuring a system bandwidth to determine whether to evaluate other frequencies for reselection (e.g., where interference is present in the measurement bandwidth). In one example, the measurement can be a wideband measurement such that interference otherwise absent or diminished in a narrowband measurement can be detected. In another example, the measurement can relate to one or more narrowband measurements, and the device can measure over the one or more narrowband measurements as well as the center narrowband of the system bandwidth. In this regard, for example, the device can average or otherwise compute related metrics to determine whether to evaluate other frequencies for reselection.

According to an example, a method of wireless communication is provided that includes determining potential interference from one or more closed subscriber group (CSG) cells over a system bandwidth and configuring one or more parameters regarding performing a measurement over at least a portion of the system bandwidth based at least in part on the determining the potential interference. The method further includes signaling the one or more parameters to one or more devices.

In another aspect, an apparatus for providing one or more parameters related to performing measurements of a system bandwidth for measuring cells in reselection is provided that includes at least one processor configured to determine potential interference from one or more closed subscriber group cells over a system bandwidth and configure one or more parameters regarding performing a measurement over at least a portion of the system bandwidth based at least in part on the determined potential interference. The at least one processor is further configured to signal the one or more parameters to one or more devices. In addition, the apparatus includes a memory coupled to the at least one processor that stores one or more instructions executable by the at least one processor.

In yet another aspect, an apparatus for providing one or more parameters related to performing measurements over a system bandwidth for measuring cells in reselection is provided that includes means for detecting potential interference from one or more closed subscriber group cells over a system bandwidth. The apparatus further includes means for signaling one or more parameters regarding performing a measurement over at least a portion of the system bandwidth to one or more devices based at least in part on the potential interference.

Still, in another aspect, a computer-program product is provided for providing one or more parameters related to performing measurements over a system bandwidth to measure cells for reselection including a computer-readable medium having code for causing at least one computer to determine potential interference from one or more closed subscriber group cells over a system bandwidth and code for causing the at least one computer to configure one or more parameters regarding performing a measurement over at least a portion of the system bandwidth based at least in part on the determining the potential interference. The computer-readable medium further includes code for causing the at least one computer to signal the one or more parameters to one or more devices.

Moreover, in an aspect, an apparatus for providing one or more parameters related to performing a measurement over a system bandwidth for measuring cells in reselection is provided that includes an interference determining component that detects potential interference from one or more closed subscriber group cells over a system bandwidth. The apparatus further includes a measurement information provisioning component that signals one or more parameters regarding performing a measurement over at least a portion of the system bandwidth to one or more devices based at least in part on the potential interference.

According to another example, a method of wireless communication is provided that includes receiving one or more frequencies within a system bandwidth of a serving base station in a neighbor list and performing one or more narrowband measurements of the one or more frequencies. The method further includes determining one or more communication metrics of the serving base station based at least in part on the one or more narrowband measurements.

In another aspect, an apparatus for measuring cells in reselection is provided that includes at least one processor configured to obtain one or more frequencies within a system bandwidth of a serving base station in a neighbor list and perform a narrowband measurement over the one or more frequencies to determine one or more signal properties. The at least one processor is further configured to determine one or more communication metrics of the serving base station based at least in part on the one or more signal properties. In addition, the apparatus includes a memory coupled to the at least one processor that stores one or more instructions executable by the at least one processor.

In yet another aspect, an apparatus for measuring cells is provided that includes means for receiving one or more frequencies within a system bandwidth of a serving base station in a neighbor list. The apparatus further includes means for performing one or more narrowband measurements of the one or more frequencies for determining one or more communication metrics related to the serving base station.

Still, in another aspect, a computer-program product is provided for measuring cells in reselection including a computer-readable medium having code for causing at least one computer to obtain one or more frequencies within a system bandwidth of a serving base station in a neighbor list. The computer-readable medium further includes code for causing the at least one computer to perform one or more narrowband measurements the one or more frequencies to determine one or more signal properties and code for causing the at least one computer to determine one or more communication metrics of the serving base station based at least in part on the one or more signal properties.

Moreover, in an aspect, an apparatus for measuring cells is provided that includes a measurement information receiving component for obtaining one or more frequencies within a system bandwidth of a serving base station in a neighbor list. The apparatus further includes a cell measuring component for performing one or more narrowband measurements of the one or more frequencies for determining one or more communication metrics related to the serving base station.

According to a further example, a method of wireless communication is provided that includes determining that a reference signal received power (RSRP) of a high priority frequency is greater than a threshold related to reselecting to higher priority frequencies. The method also includes determining that a reference signal received quality (RSRQ) of a target cell operating at the high priority frequency is greater than a threshold related to performing an intra-frequency or inter-frequency search and reselecting the target cell at the high priority frequency.

In another aspect, an apparatus for reselecting cells in wireless communication is provided that includes at least one processor configured to determine that a reference signal received power of a high priority frequency is greater than a threshold related to reselecting to higher priority frequencies. The at least one processor is further configured to determine that a reference signal received quality of a target cell operating at the high priority frequency is greater than a threshold related to performing an intra-frequency or inter-frequency search and reselect the target cell at the high priority frequency. In addition, the apparatus includes a memory coupled to the at least one processor that stores one or more instructions executable by the at least one processor.

In yet another aspect, an apparatus for performing cell reselection is provided that includes means for determining that a reference signal received power of a high priority frequency is greater than a threshold related to reselecting to higher priority frequencies, and that a reference signal received quality of a target cell operating at the high priority frequency is greater than a threshold related to performing an intra-frequency or inter-frequency search. The apparatus further includes means for reselecting the target cell at the high priority frequency.

Still, in another aspect, a computer-program product is provided for performing cell reselection including a computer-readable medium having code for causing at least one computer to determine that a reference signal received power of a high priority frequency is greater than a threshold related to reselecting to higher priority frequencies. The computer-readable medium further includes code for causing the at least one computer to determine that a reference signal received quality of a target cell operating at the high priority frequency is greater than a threshold related to performing an intra-frequency or inter-frequency search and code for causing the at least one computer to reselect the target cell at the high priority frequency.

Moreover, in an aspect, an apparatus for performing cell reselection is provided that includes a cell measuring component that determines that a reference signal received power of a high priority frequency is greater than a threshold related to reselecting to higher priority frequencies, and that a reference signal received quality of a target cell operating at the high priority frequency is greater than a threshold related to performing an intra-frequency or inter-frequency search. The apparatus further includes a cell reselecting component that reselects the target cell at the high priority frequency.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
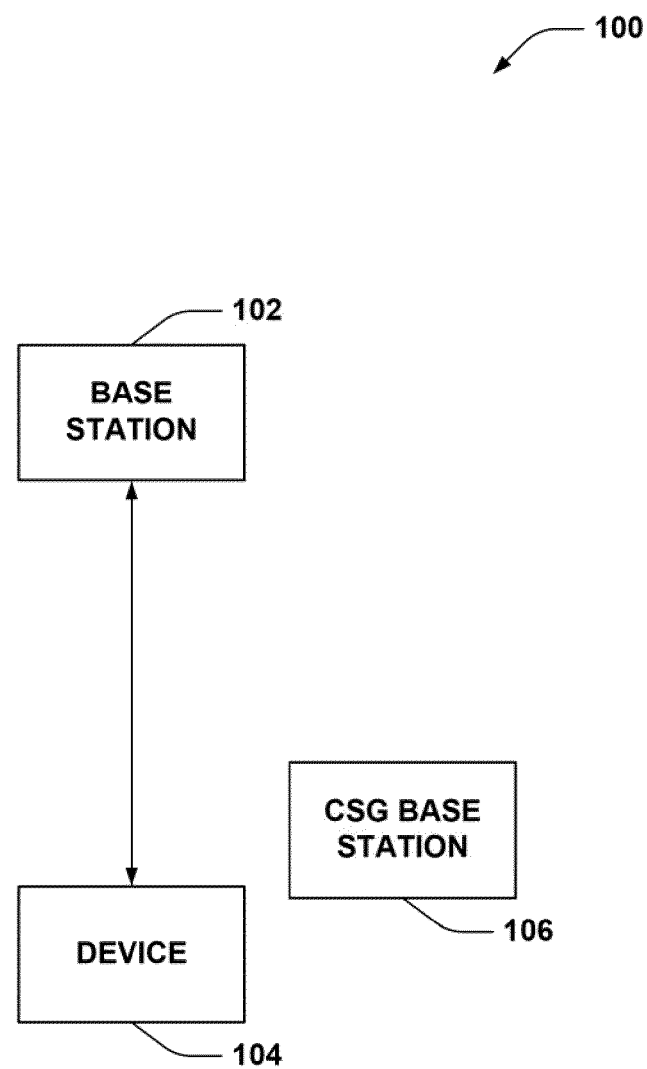
FIG. 1 illustrates an example system for measuring a base station with potential interference from a closed subscriber group (CSG) base station.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, one or more parameters for performing a measurement of a current system bandwidth can be received at a device for determining whether to evaluate cells on a current serving frequency or on other frequencies for reselection. The parameters can relate to performing a wideband measurement of signals over the system bandwidth for one or more communication metrics, such as signal quality, signal power, etc., to detect partial co-channel interference in the system bandwidth of the serving frequency. In an additional or alternative example, the parameters can relate to performing a measurement of signals over a narrowband portion of the system bandwidth. In yet another example, one or more frequencies over which to perform narrowband measurements for detecting potential co-channel interferers can be specified in a neighbor list as a high or substantially equal priority frequency relative to a serving frequency. Thus, partial co-channel interference can be detected and analyzed where signals over one or more frequencies are measured for reselection to improve reliability of the measurements for reselection.

In another example, in co-channel deployments, a device can reselect to a higher priority frequency if a reference signal received power (RSRP) of the frequency is, greater than a threshold for measuring on a high priority frequency over a given period of time, and a reference signal received quality (RSRQ) related to the cell is greater than a threshold that indicates whether to search intra- or inter-frequency for cells in reselection.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates measuring signals from cells over one or more frequencies to determine whether to reselect to one or more of the cells. System 100 includes a base station 102 that can communicate with device 104 to provide access to a wireless network (not shown). For example, base station 102 can be a macrocell, femtocell, picocell, or similar base station, relay node, mobile base station, UE (e.g., communicating in peer-to-peer or ad-hoc mode with device 104), a portion thereof, and/or substantially any device that provides one or more disparate devices with access to a wireless network. Moreover, a CSG base station 106 can be deployed near device 104 and can potentially cause at least partial co-channel interference to communications with base station 102. In addition, for example, the CSG base station 106 can disallow access requests from device 104 (e.g., can be blacklisted at device 104 such that device 104 does not attempt access). Further, in an example, the CSG base station 106 can also be a hybrid mode base station that provides at least a minimum level of service to non-allowed devices, and/or substantially any base station that classifies services provided to a subset of devices.

According to an example, device 104 can be mobile within a wireless network and can reselect base stations to facilitate seamless access to the wireless network while moving in and out of coverage areas. For example, reselection can refer to transferring device communications among base stations. A device, such as device 104, can perform measurements of signals received from neighboring cells and a serving cell to determine one or more communications metrics thereof (e.g., signal-to-noise ratio (SNR), etc.), and can transmit a measurement report to a serving base station, such as base station 102. In this example, serving base 102 station can then determine whether to initiate reselection of device 104 to one or more of the cells based at least in part on the measurement report (e.g., where one cell provides more desirable communication metrics than the serving cell). The device 104 can perform measurements of cells on a current serving frequency (also referred to herein as an intra-frequency measurement) and/or on other frequencies (also referred to herein as an inter-frequency measurement). Determining whether to perform intra-frequency or inter-frequency measurements can be based, for example, on a level of interference experienced within a given system bandwidth.

System bandwidth can refer to a portion of bandwidth utilized by a base station (e.g., base station 102, CSG base station 106, etc.) centered at a serving frequency to communicate with one or more devices, such as device 104. For example, where the system bandwidth is interfered with by one or more non-allowed CSG cells or other devices, the device 104 can determine to perform inter-frequency measurements, as described further herein, to evaluate cells centered at other frequencies for reselection. It is to be appreciated that the device 104 can determine the CSG cell provided by CSG base station 106, for example, is a non-allowed CSG cell based at least in part on a failed connection attempt thereto, locating the CSG cell (or an identifier thereof) in a blacklist of non-allowed CSG cells, and/or the like.

For example, CSG base station 106 can be deployed on a portion of the system bandwidth utilized by base station 102, causing at least partial co-channel interference within the system bandwidth. In this regard, device 104 can perform a measurement of signals received from one or more cells over a narrowband center portion of the system bandwidth (e.g., the center n resource blocks, where n is an integer less than or equal to a total number of resource blocks in the system bandwidth) to determine whether to perform inter-frequency measurements for reselection. Thus, for example, device 104 may not detect the partial co-channel interference (e.g., where the CSG base station 106 is offset in frequency from the narrowband center of the base station 102 system bandwidth, and thus not included in the narrowband measurement). In this example, device 104 may continue communicating with base station 102, though interference from CSG base station 106 results in a low SNR.

In this regard, for example, base station 102 can configure device 104 with one or more parameters for performing an idle state measurement bandwidth that includes frequency and/or time resources subject to such partial co-channel interference. The one or more parameters, for example, can relate to a frequency bandwidth to be measured (e.g., a number of megahertz (MHz), a number of resource blocks or other manner of specifying frequency bandwidth). In another example, the one or more parameters can additionally or alternatively include a time period to measure (e.g., a number of milliseconds or other time period measurements). In either case, the one or more parameters indicate resources over which to perform measurements of signals from one or more base stations or other devices. Base station 102 can provide the one or more parameters to the device 104 upon connection. For example, this can include signaling the one or more parameters to device 104 in one or more event-triggered signals, in other signals, and/or the like.

In one example, one or more components of the wireless network can notify base station 102 when it expects CSG base station 106 to cause interference to base station 102 (e.g., based on detecting installation of CSG base station 106, a location of the CSG base station 106, a frequency used by CSG base station 106, and/or the like), and base station 102 can then transmit the measurement bandwidth to device 104 (e.g., via dedicated signaling, broadcast signaling in system information blocks, etc.). In any case, device 104 can utilize the one or more parameters for performing one or more measurements within the system bandwidth of the base station 102 to determine one or more communication metrics related thereto. For example, performing measurements within the system bandwidth can include determining one or more signal properties related to a signal of the base station 102 (and/or one or more other base stations) within the system bandwidth, such as RSRP, received signal strength indicator (RSSI), RSRQ, and/or the like. For example, the signal properties can be utilized to determine whether to perform inter-frequency measurement(s) during cell reselection (e.g., where RSRQ is below a threshold value used to indicate inter-frequency measurement should be performed) or whether to perform cell reselection on the serving frequency and/or continue communications with base station 102.

For example, device 104 can obtain one or more parameters related to measuring a system bandwidth, which can specify parameters for performing a wideband measurement from the base station 102 (e.g., in dedicated or broadcast signaling, as described). Device 104 can thus perform one or more wideband measurements within the system bandwidth of signals received from one or more base stations, including base station 102, or devices to determine power, quality, or other communication metrics of the signals. Using the communication metrics, for example, device 104 can determine whether to perform one or more inter-frequency measurements to evaluate other frequencies for cell reselection or perform cell reselection on the serving frequency and/or continue communications with base station 102. In this regard, the wideband measurement specified by the one or more parameters can include at least a portion of the system bandwidth interfered with by CSG base station 106, and device 104 can thus detect the interference. In addition, for example, device 104 can perform a narrowband measurement at one or more frequencies within the system bandwidth in combination with the wideband measurement and can utilize both measurements to determine whether to perform one or more inter-frequency measurements for cell reselection.

In another example, base station 102 can configure one or more parameters to the device 104 for performing one or more narrowband measurements within the system bandwidth. For example, in this regard, base station 102 can advertise frequencies in its neighbor list that correspond to one or more frequencies within the system bandwidth of base station 102 where CSG base station 106 and/or one or more other potentially interfering CSG base stations communicate. A neighbor list can refer to a list of one or more neighboring base stations on one or more frequencies that may be used for measuring cells of the base stations for reselection. The neighbor list can include frequencies ranked by priority, and the device 104 can perform measurements of signals from cells on the highest priority frequency first, and so on until it determines a frequency (or related cell) for possible reselection. In this regard, device 104 can perform narrowband measurements over the one or more frequencies in the neighbor list to determine whether the system bandwidth is suitable for continuing communications and/or reselecting to one or more cells on the serving frequency, or whether to perform one or more inter-frequency measurements for cell reselection. In one example, device 104 can combine the narrowband measurements over the one or more frequencies with a measurement performed within a center narrowband of the serving frequency to facilitate such determination. In either case, for example, the one or more parameters can relate to measuring frequencies that have no cells centered thereon; rather measuring the frequencies allows for detecting at least potential partial co-channel interference from one or more cells.

Moreover, for example, base station 102 can advertise the frequencies in the neighbor list as high priority frequencies (e.g., higher than the serving frequency) so the device 104 can perform narrowband measurements over the one or more frequencies along with or before performing a measurement on the center narrowband of the serving frequency, which allows device 104 to consider potential interference from one or more CSG cells over the system bandwidth. In addition, in an example, base station 102 can advertise the one or more frequencies, in the neighbor list or otherwise, as substantially equal priority to the serving frequency. In this example, device 104 can bar the serving frequency for reselection for a specified period of time where it detects CSG base station 106 has a threshold level RSRP over base station 102. Barring the frequency, for example, can refer to refraining from considering or measuring cells on the barred frequency as part of reselection.

In yet another example, CSG base station 106 can be deployed within the same system bandwidth as base station 102. In this example, and/or in the examples above, regardless of whether CSG base station 106 interferes over the whole system bandwidth (e.g., co-channel interference) over only part of the system bandwidth (e.g., partial co-channel interference), device 104 can reselect to a cell on a frequency of higher priority than a current frequency (e.g. based on a neighbor list) where RSRP for the frequency is over a threshold level set in device 104 for reselecting to a higher priority frequency for a period of time, and where the RSRQ of the target cell on the higher priority frequency is greater than a threshold for performing an intra- and/or inter-frequency search for another cell.

Figure 2:
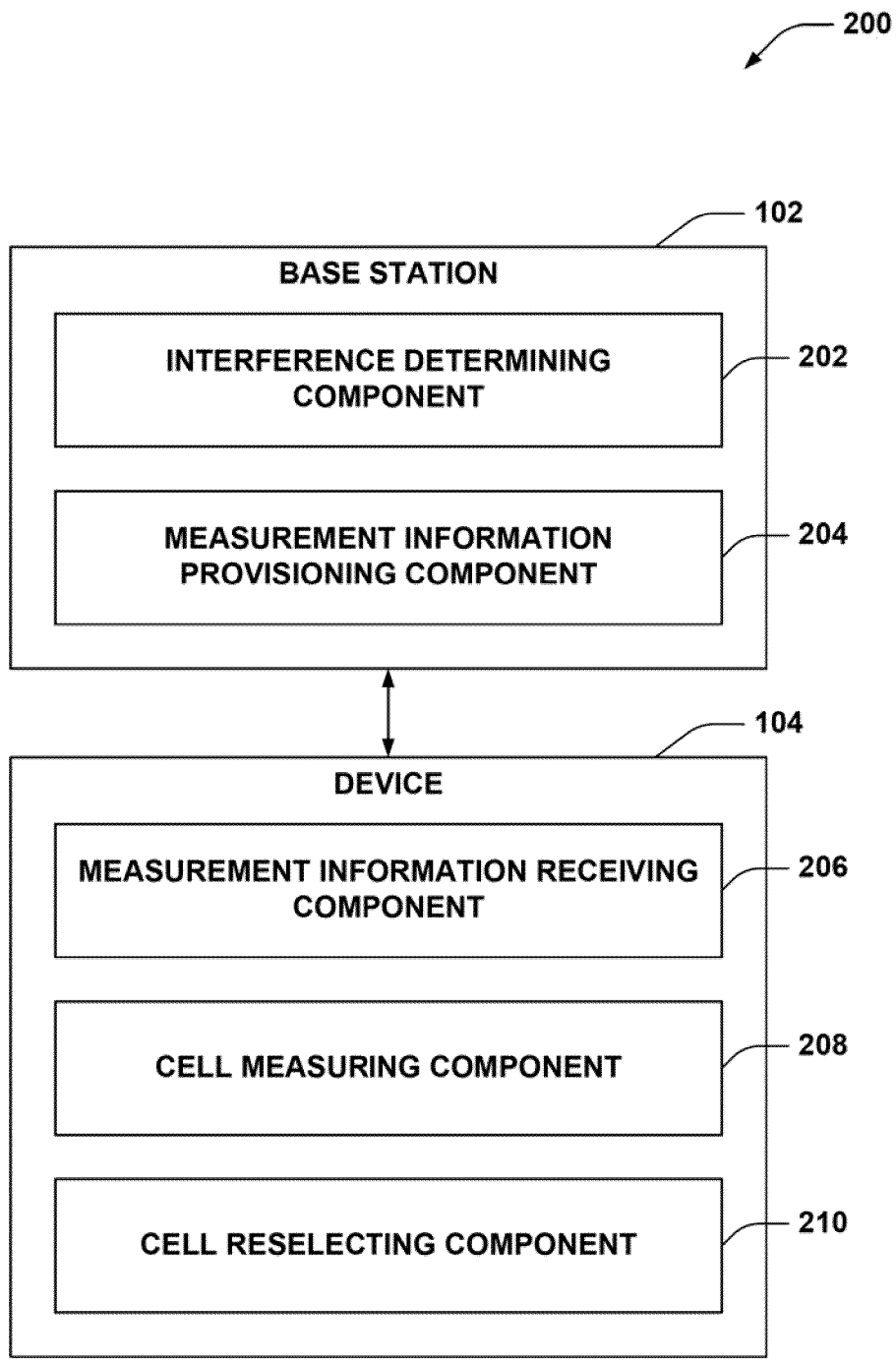
FIG. 2 illustrates an example system for receiving measurement parameters from a base station for measuring at least a portion of a potentially interfered system bandwidth.

Turning to FIG. 2, illustrated is an example wireless communications system 200 that facilitates reselecting cells in a wireless network. System 200 comprises a base station 102, which as described can provide network access to a plurality of devices, such as device 104. Base station 102 can comprise an interference determining component 202 that decides whether signals from base station 102 can be at least potentially interfered with by, one or more disparate base stations (such as CSG base stations), and a measurement information provisioning component 204 that communicates one or more parameters related to measuring signals in one or more cells to a device. Device 104 can comprise a measurement information receiving component 206 that obtains one or more parameters related to measuring cells from a base station, a cell measuring component 208 that evaluates one or more neighboring cells on a same or different frequency according to the one or more parameters, and a cell reselecting component 210 that reselects to one or more of the neighboring cells based at least in part on the search.

According to an example, measurement information provisioning component 204 can communicate one or more parameters regarding performing one or more measurements of signals received in a system bandwidth to device 104, and measurement information receiving component 206 can obtain the one or more parameters. For example, the one or more parameters can relate to a measurement bandwidth, as described. For instance, in one example, interference determining component 202 can detect potential interference based at least in part on existence of a CSG cell that utilizes a frequency within or adjacent to a system bandwidth utilized by base station 102. Moreover, in an example, interference determining component 202 can receive location information regarding the CSG cell and determine whether it potentially interferes with device 104 based on comparing locations (e.g., determining whether a location of the CSG cell is within a threshold distance of base station 102), etc. In one example, interference determining component 202 can receive an indication from a component of the wireless network (not shown) as to the existence of a CSG cell, the frequency on which the cell operates, location of the CSG cell, etc. In addition, interference determining component 202, in one example, can detect the potential interference based at least in part on comparing a location of the device 104 to the CSG cell location.

Based at least in part on interference determining component 202 discerning the potential interference, measurement information provisioning component 204 can signal the one or more parameters to device 104. In one example, measurement information provisioning component 204 can specify one or more parameters related to performing a wideband measurement to device 104, such as a center frequency along with a total bandwidth to be measured, a start and end frequency, and/or the like. Moreover, for example, measurement information provisioning component 204 can select the wideband measurement to be of a size that includes the potential interference from the center of the bandwidth; in one example, the wideband measurement can include the entire system bandwidth utilized by base station 102, or at least include a bandwidth greater than the bandwidth of a narrowband measurement that can be performed by the device 104 at a frequency within the system bandwidth (e.g., greater than six resource blocks or 1.08 MHz) where it does not receive signaling of the measurement bandwidth. In this example, measurement information provisioning component 204 can configure one or more parameters regarding performing dynamic wideband measurements over at least a portion of a system bandwidth to be performed by device 104 (e.g., in one or more signals); in another example, it is to be appreciated that measurement information provisioning component 204 can configure one or more parameters regarding performing a fixed wideband measurement of a system bandwidth by device 104 (e.g., during initial connection), and/or the like.

In one example, measurement information provisioning component 204 can signal the wideband measurement as one or more channel numbers allowed by a network specification (e.g., on a 100 kilohertz raster). In addition, for example, the wideband measurement can be such that no cells are centered at a center frequency related to the wideband measurement. In any case, in another example, measurement information provisioning component 204 can provide one or more parameters regarding performing the wideband measurement to device 104 that is centered within or offset from the center of the system bandwidth.

In any case, measurement information receiving component 206 can obtain the one or more parameters regarding performing the wideband measurement, and cell measuring component 208 can perform a measurement over the system bandwidth corresponding to the one or more parameters (to detect signals received from one or more cells). Thus, for example, instead of (or in addition to) performing a narrowband measurement at the center frequency of the system bandwidth, as described, cell measuring component 208 performs a measurement of signals over the system bandwidth, where the measurement may be performed at the center frequency of the system bandwidth or may be offset from the center frequency of the system bandwidth. In this regard, cell measuring component 208 can capture a portion of the system bandwidth in the measurement that includes at least potential partial co-channel interference from a CSG cell. If the partial co-channel interference is greater than a threshold interference (and device 104 is not allowed to communicate in the CSG cell), for example, cell measuring component 208 can perform measurements over other frequencies (e.g., inter-frequency measurements) in cell reselection.

In another example, measurement, information provisioning component 204 can provide one or more parameters regarding measuring system bandwidth to the device 104 at least in part by advertising one or more frequencies within the system bandwidth that are at least partially utilized by one or more potentially interfering CSG cells in a neighbor list, as described. Measurement information receiving component 206 can obtain the neighbor list of the one or more frequencies, and cell measuring component 208 can perform narrowband measurements over the one or more frequencies within the system bandwidth. In this regard, measurement information provisioning component 204 can indicate the one or more frequencies as at least equal (or higher) priority than the serving frequency. Thus, cell measuring component 208 can potentially encounter interference when performing measurements over the one or more frequencies, as described, and can determine whether to perform measurements at other frequencies (outside of the system bandwidth) in view of the interference. In either case, in another example, cell measuring component 208 can measure cells in the selected frequency in cell reselection and can send a measurement report to base station 102. Cell reselecting component 210 can reselect to one or more cells on the same or different frequency (e.g. based at least in part on base station 102 determining whether to initiate reselection). Though described in reference to a system bandwidth and serving frequency of base station 102, it is to be appreciated that device 104 can perform similar functions for other frequencies received in a neighbor list (e.g., after determining the serving frequency is unsuitable for reselection and/or continuing communications).

Moreover, in one example, cell reselecting component 210 can reselect to a cell on a higher priority frequency, as indicated in the neighbor list, if the RSRP of the higher priority frequency is greater than a threshold RSRP required to reselect to a cell on a frequency having higher priority than a current frequency (e.g., the current serving frequency), and RSRQ of the target cell is greater than a threshold for searching other cells (e.g., intra- or inter-frequency). In this regard, for example, cell measuring component 208 can determine such regarding the RSRP and RSRQ. Cell measuring component 208, as described herein, can obtain the thresholds from a hardcoding, specification, configuration, and/or the like. For example, cell measuring component 208 can exist within a processor and the thresholds can be hardcoded within the processor instructions. In another example, cell measuring component 208 can receive a specification or configuration from a network component, from memory at device 104, and/or the like, that specifies the thresholds, etc. In this regard, cell reselecting component 210 can reselect the target cell based at least in part on the determinations from the cell measuring component 208. In another example, the logic of determining whether to reselect can be performed by base station 102, and base station 102 can cause device 104 to reselect based on the RSRP and RSRQ received and/or computed by cell measuring component 208.

Figure 3:
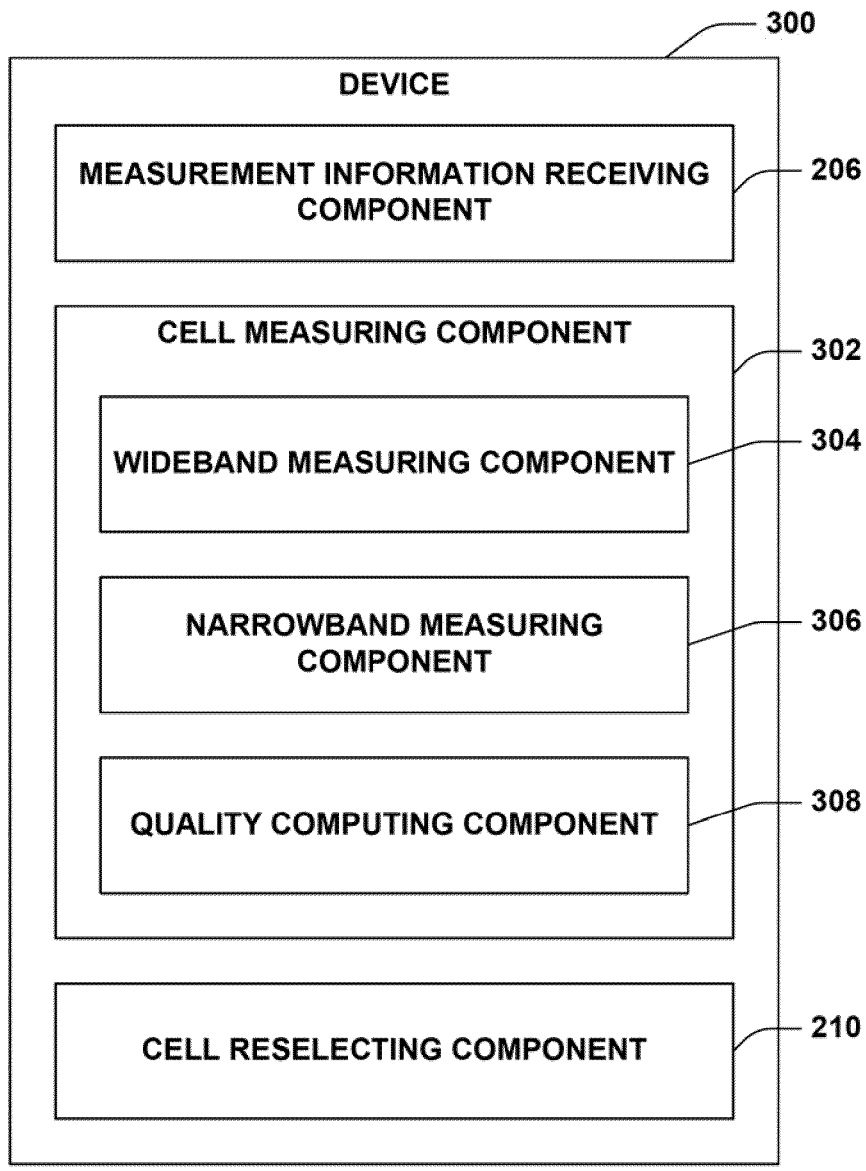
FIG. 3 illustrates an example device that facilitates performing a wideband measurement over at least a portion of a system bandwidth in reselection.

Referring to FIG. 3, illustrated is an example device 300 that performs wideband measurements over a system bandwidth to determine whether to perform reselection or measure other frequency bands. Device 300, for example, can be a version of device 104 (FIGS. 1 and 2) configured for performing wideband measurements over the system bandwidth in system 100 or system 200. Device 300, for example, can communicate with one or more cells of one or more base stations (not shown) to receive access to a wireless network. Device 300 comprises a measurement information receiving component 206 that obtains one or more parameters regarding performing a wideband measurement related to a system bandwidth from a base station (not shown), a cell measuring component 302 that performs measurements over one or more neighboring cells and/or different frequencies for reselection based at least in part on the wideband measurement, and a cell reselecting component 210 that can initiate reselection to the one or more neighboring cells on the same or different frequency. For example, cell measuring component 302 comprises a wideband measuring component 304 that performs a wideband measurement over a system bandwidth, a narrowband measuring component 306 that performs a narrowband measurement at one or more frequencies within the system bandwidth, and a quality computing component 308 that determines a quality of signals received during one or more of the measurements.

According to an example, as described, measurement information receiving component 206 can obtain one or more parameters regarding performing a wideband measurement over the system bandwidth from a base station (e.g., a serving frequency, a frequency range, a starting and ending frequency of the wideband measurement, and/or the like). Wideband measuring component 304 can perform a wideband measurement over the system bandwidth (e.g., as a single wideband measurement over the system bandwidth, multiple measurements, etc.) according to the one or more parameters. For example, the wideband measurement can relate to measuring one or more communication metrics, such as RSSI, RSRP, RSRQ, etc., received within the system bandwidth. In this example, cell measuring component 302 can determine whether to attempt cell reselection on the serving frequency and/or measure other frequencies based at least in part on the communication metrics from the measurement. For example, a CSG cell can cause partial co-channel interference over a system bandwidth of a base station, as described, such that performing a narrowband measurement over a center of the serving frequency may not allow for detecting the interference. Wideband measuring component 304, however, can discover the interference at least in part by performing the measurement over the system bandwidth.

In addition, for example, quality computing component 308 can compute RSRQ based at least in part on the RSSI and RSRP. For example, quality computing component 308 can compute the RSRQ by multiplying the RSSI and RSRP. Moreover, quality computing component 308 can multiply the result by a factor, N, that accounts for different measurement units between RSSI and RSRP. Moreover, in an example, narrowband measuring component 306 can perform a narrowband measurement at the center frequency (e.g., serving frequency) of the system bandwidth (e.g., the center n resource blocks of the system bandwidth) in conjunction with wideband measuring component 304 performing the wideband measurement over the system bandwidth, and quality computing component 308 can compute the RSRQ as a narrowband RSRP divided by wideband RSSI. Moreover, for example, quality computing component 308 can multiply the result by a factor, N, as described.

In any case, cell measuring component 302 can utilize the RSRQ to determine whether to perform cell reselection to one or more cells on the serving frequency, whether to measure other frequencies for cell reselection, whether to declare out-of-service, etc. Thus, for example, cell measuring component 302 can compare the RSRQ to a threshold related to performing an intra-frequency measurements for cell reselection, a threshold related to performing an inter-frequency measurements for cell reselection, a threshold related to reselecting to a higher priority frequency, lower priority frequency, or same frequency as the base station, a threshold related to declaring out-of-service, and/or the like. The thresholds, for example, can be obtained from a hardcoding, specification, or configuration by device 300, discerned from historical thresholds, and/or the like. In another example, measurement information receiving component 206 can obtain instructions for performing a plurality of narrowband measurements (as opposed to a wideband measurement). In addition, for example, narrowband measuring component 306 can perform the narrowband measurements at one or more frequencies within the system bandwidth to determine the RSRP, RSSI, RSRQ, etc. of signals received over the narrowband frequencies. In any case, once cell measuring component 302 determines a frequency for measuring cells for reselecting, cell measuring component can create a measurement report related to one or more cells on the frequency for transmitting to a base station in reselection. In this example, cell reselecting component 210 can reselect to a target cell on, the determined frequency, as described.

Figure 4:
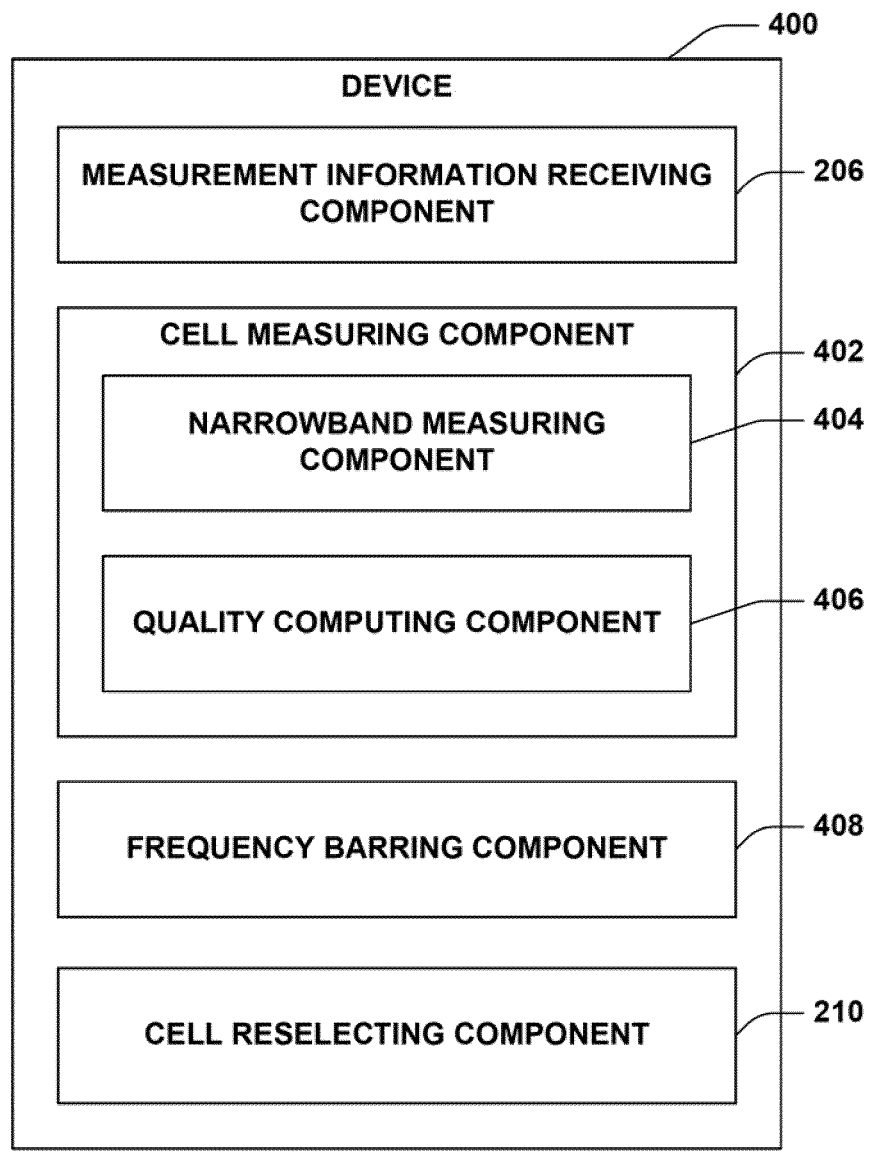
FIG. 4 illustrates an example device for performing a plurality of narrowband measurements at one or more frequencies within a system bandwidth in reselection.

Turning now to FIG. 4, an example device 400 is shown that performs multiple narrowband measurements at one or more frequencies within a system bandwidth to determine whether to perform reselection or measure other frequency bands. Device 400, for example, can be a version of device 104 (FIGS. 1 and 2) configured for performing multiple narrowband measurements at one or more frequencies within the system bandwidth of system 100 or system 200. Device 400, for example, can communicate with one or more cells of one or more base stations (not shown) to receive access to a wireless network. Device 400 comprises a measurement information receiving component 206 that obtains one or more parameters regarding one or more frequencies within a system band from a base station (not shown) over which to perform narrowband measurements, a cell measuring component 402 that performs narrowband measurements of neighboring cells and/or different frequencies for reselection based at least in part on the one or more parameters, and a frequency barring component 408 that can exclude one or more frequencies from reselection based on detecting interference on the one or more frequencies. For example, cell measuring component 402 comprises a narrowband measuring component 404 that performs a plurality of narrowband measurements at one or more frequencies within the system bandwidth, and a quality computing component 406 that determines a quality of signals received at the one or more frequencies.

According to an example, measurement information receiving component 206 can obtain a neighbor list from a base station as the one or more parameters regarding performing one or more narrowband measurements at a serving frequency, as described, which can include one or more frequencies within the system bandwidth of the base station that are occupied by one or more CSG cells or other interfering base stations. In this regard, as described, the one or more CSG cells can operate on a frequency spectrum that is adjacent to or within the system bandwidth of the base station, and thus can potentially cause partial co-channel interference to the base station. In this regard, narrowband measuring component 404 can perform narrowband measurements over the one or more frequencies within the system bandwidth advertised in the neighbor list for determining one or more communication metrics, such as RSRP, RSSI, RSRQ, etc. of one or more signals related to one or more cells. In one example, cell measuring component 402 can determine whether the system bandwidth is suitable for communication based at least in part on the communication metrics (e.g., whether one or more of the metrics are at a threshold level, as described). In one example, as described, the one or more frequencies can be indicated as higher priority frequencies in the neighbor list, as compared to the serving frequency of the base station, to ensure narrowband measuring component 404 performs narrowband measurements over the one or more frequencies.

In one example, narrowband measuring component 404 can also perform the narrowband measurement at the center frequency of the system bandwidth, and quality computing component 406 can combine the measurements for determining whether to reselect on the one or more frequencies and/or measure other frequencies. In one example, quality computing component 406 can compute an RSRP for the multiple narrowband measurements by averaging the RSRPs (e.g., (RSRP_serving+RSRP_other)/2, where RSRP_serving is RSRP of the narrowband measurement at the center frequency of the system bandwidth, and RSRP_other is a narrowband measurement at another frequency within the system bandwidth received in a measurement report). In another example, quality computing component 406 can compute an RSSI for the multiple measurements by adding the RSSIs. In yet another example, quality computing component 406 can determine an RSRQ for the multiple narrowband measurements by dividing the computed RSRP by the computed RSSI (and/or by multiplying a factor that is computed by adding the factors corresponding to the narrowband measurements, as described above).

Similarly, as described with respect to wideband measurements, cell measuring component 402 can utilize the RSRQ to determine whether to reselect one or more cells, whether to monitor other frequencies for reselection, whether to declare out-of-service, etc. Thus, for example, cell measuring component 402 can compare the RSRQ to a threshold related to performing an intra-frequency measurement for reselection, a threshold related to performing an inter-frequency measurement for reselection, a threshold related to reselecting to a higher priority frequency, lower priority frequency, or same frequency as the base station, a threshold related to declaring out-of-service, and/or the like to facilitate such determining.

In yet another example, measurement information receiving component 206 can obtain the neighbor list, which can have one or more frequencies within the system bandwidth of a base station classified as substantially equal priority to the serving frequency. In this example, narrowband measuring component 404 can perform narrowband measurements at the one or more frequencies within the system bandwidth more often than equal priority frequencies outside of the system bandwidth. Narrowband measuring component 404 can perform measurements over the one or more frequencies and can thus be exposed to interference from a non-allowed CSG that has a RSRP or similar strength indicator that is at least a threshold level higher than the base station. In this example, frequency barring component 408 can exclude the serving frequency of the base station in making further measurements for a period of time so as not to waste power. Cell measuring component 402 can then select a next highest priority unbarred frequency to search for cells for reselection, in one example. In any case, as described, once cell measuring component 402 determines a frequency for reselection, cell measuring component 402 can generate a measurement report of cells on the frequency for transmitting to a base station. In addition, cell reselecting component 210 can perform reselection to one or more target cells on the determined frequency.

Figure 5:
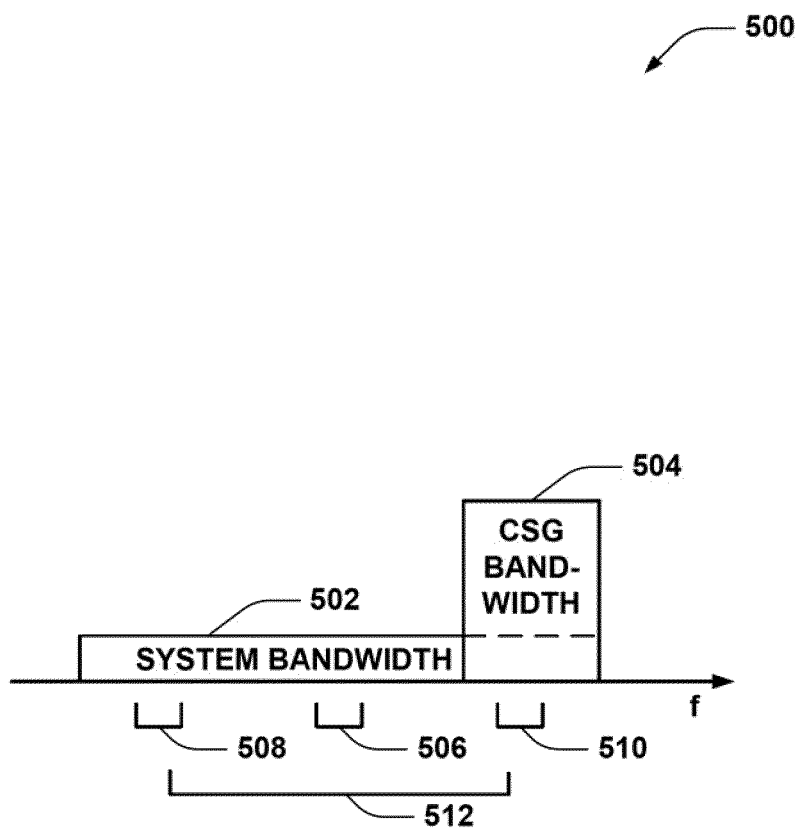
FIG. 5 illustrates an example portion of bandwidth in accordance with aspects described herein.

Turning to FIG. 5, an example portion of frequency bandwidth 500 is shown in accordance with aspects described herein. In particular, a system bandwidth 502 of a base station and a system bandwidth utilized by a CSG, CSG bandwidth 504, are shown on the portion of frequency bandwidth 500. As depicted, the CSG bandwidth 504 at least partially interferes with system bandwidth 502. In an example, devices that do not receive measurement bandwidths from a base station, as described above, can measure a center portion 506 of system bandwidth 502, and thus may not detect interference by CSG bandwidth 504. In this regard, as described herein, a base station utilizing system bandwidth 502 can signal additional measurements and/or alternative measurement bandwidth to a device to allow the device to capture interference from CSG bandwidth 504 in determining whether to measure cells on the system bandwidth 502 for reselection.

For example a device can receive parameters regarding performing additional narrowband measurements 508 and/or 510 from a base station, and can perform such measurements at the corresponding frequencies within the system bandwidth 502. In this regard, for example, the device can capture interference from the CSG bandwidth 504 in measurement 510, as described. In an example, the device can determine the interference based at least in part on the measurement 510, on combining measurements 506, 508, and 510, and/or the like. Thus, if the measurement 510 and/or combination of measurements 506, 508, and 510 indicate interference above a threshold level, the device can perform measurements at other frequencies to determine one or more frequencies for reselection. As described, it is to be appreciated that parameters regarding substantially any number of narrowband measurements can be signaled by a base station and performed by a device over substantially any part of system bandwidth 502. In addition, the narrowband measurements 508 and 510 can be of similar size as measurement 510.

In another example, as described, a wideband measurement 512 can be performed by the device over the system bandwidth based on a signal from the base station comprising one or more parameters that specify the wideband measurement (e.g., a related frequency span, a center frequency, a starting and ending frequency for the wideband measurement, etc.). As described, wideband measurement 512 can be at the center frequency of the system bandwidth 502 or offset from the center frequency to cover substantially any portion of system bandwidth 502. In one example, wideband measurement 512 can be over the full system bandwidth 502. Moreover, in one example, the wideband measurement 512 can be combined with the narrowband measurement 506.

Figure 6:
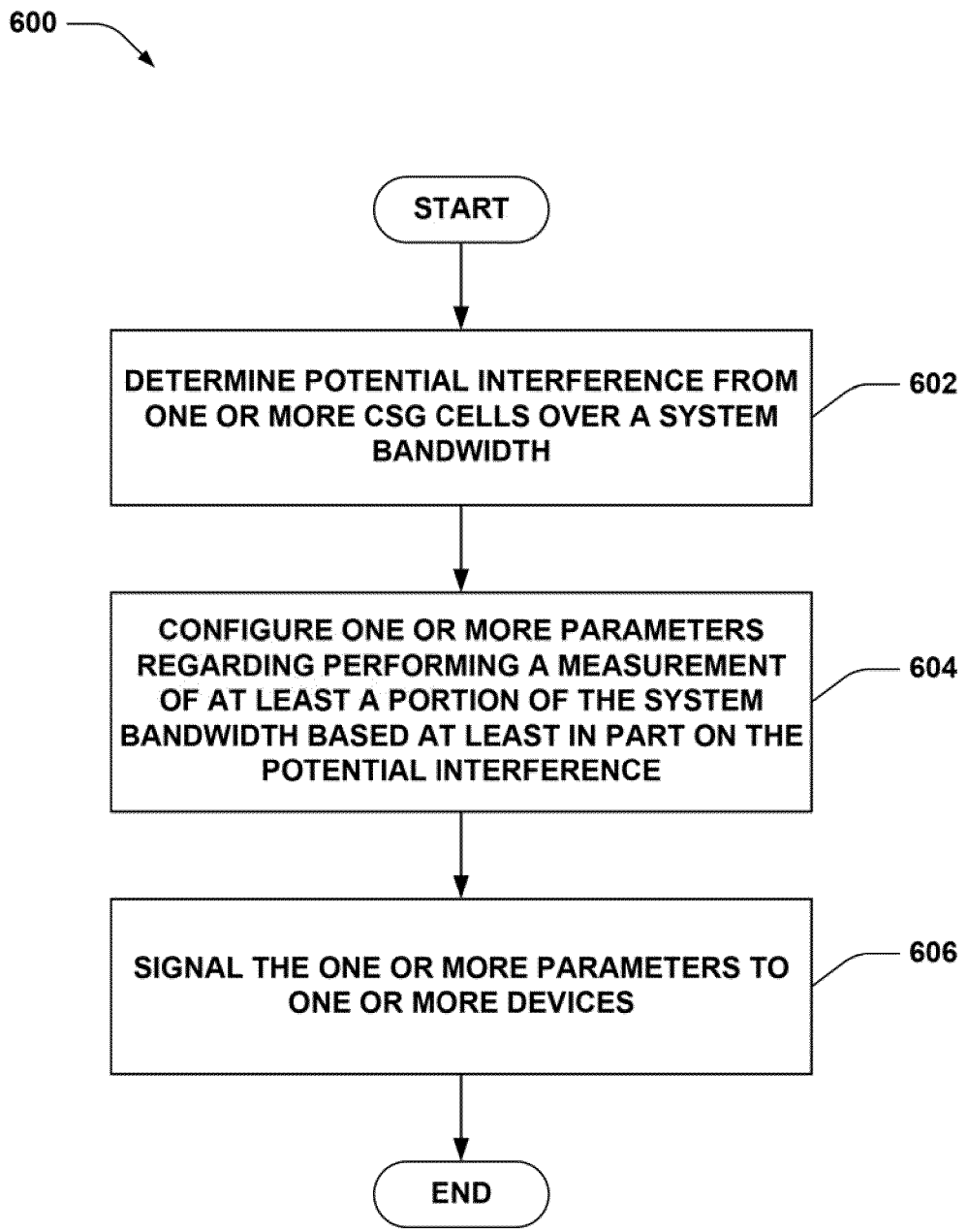
FIG. 6 illustrates an example methodology that facilitates communicating parameters regarding a measurement bandwidth to one or more devices for measuring a system bandwidth.
Figure 7:
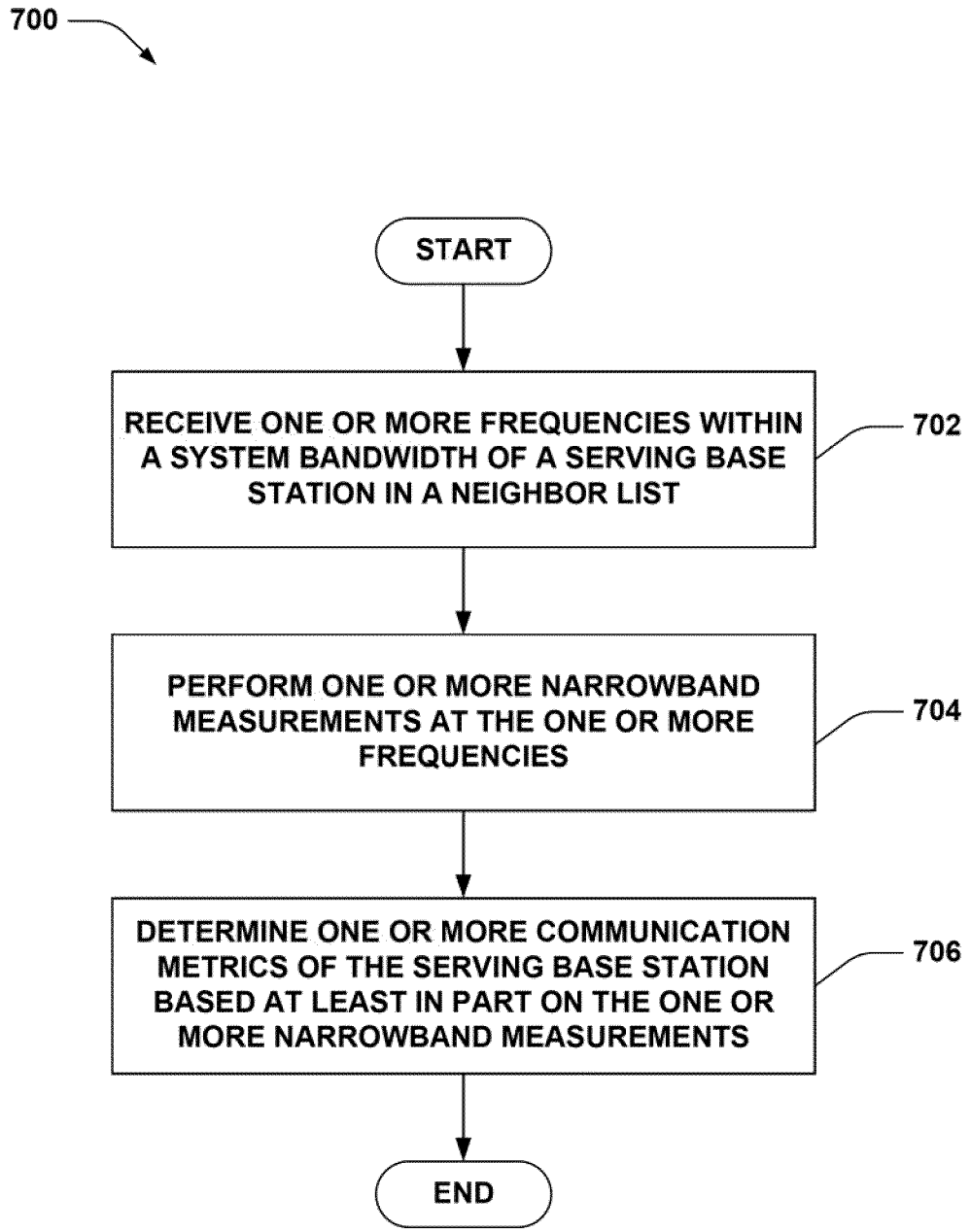
FIG. 7 illustrates an example methodology that facilitates measuring a system bandwidth according to received parameters.
Figure 8:
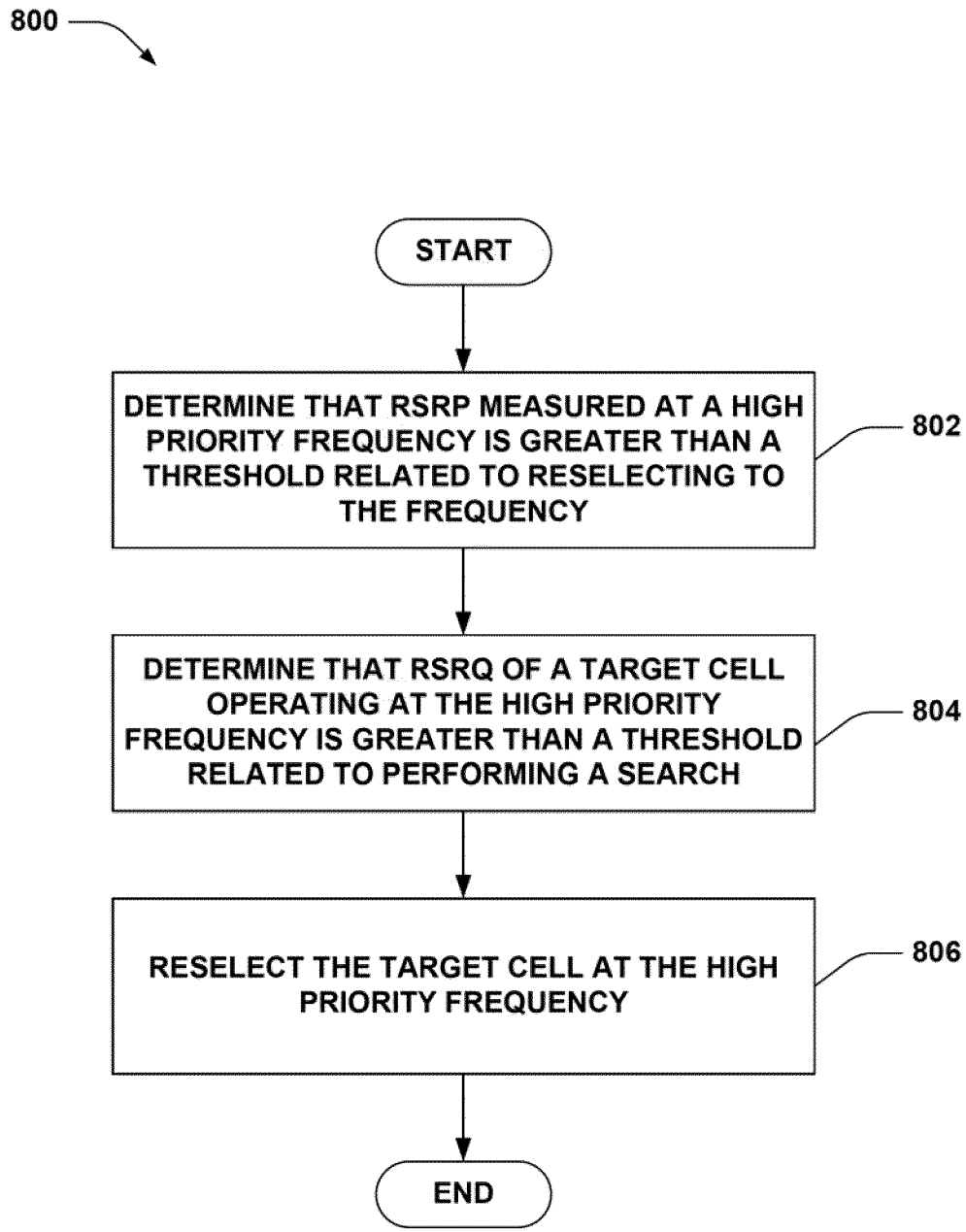
FIG. 8 illustrates an example methodology for reselecting to a target cell.

Referring to FIGS. 6-8, example methodologies relating to performing measurements at one or more frequencies within the system bandwidth for determining whether to perform cell reselection are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 6, an example methodology 600 is depicted that facilitates communicating one or more measurements to one or more devices. At 602, potential interference can be determined from one or more CSG cells over a system bandwidth. As described, for example, this can include determining existence of the CSG cells, frequencies utilized by the CSG cells (e.g., and whether the frequencies are within or adjacent to the system bandwidth), location of the CSG cells (e.g., relative to one or more devices), and/or the like. At 604, one or more parameters regarding performing a measurement over at least a portion of the system bandwidth can be configured based at least in part on the potential interference. As described, the one or more parameters can be configured to include at least a portion of the one or more cell frequencies within a system bandwidth that may suffer from interference due to a CSG cell. Additionally or alternatively, the one or more parameters can relate to one or more wideband measurements, a plurality of narrowband measurements, and/or the like. In any case, at 606, the one or more parameters can be signaled to the one or more devices. As described, for example, where the one or more parameters relate to one or more narrowband measurements over the system bandwidth, the one or more parameters regarding frequencies over which narrowband measurements are to be performed within the system bandwidth can be signaled in a neighbor list.

Turning to FIG. 7, an example methodology 700 is depicted that facilitates evaluating a system bandwidth according to one or more received parameters. At 702, one or more frequencies within a system bandwidth of a serving base station can be received in a neighbor list. For example, the one or more frequencies can have a priority at least substantially equal to or greater than the serving frequency so the frequencies can be measured as part of determining whether to perform reselection to one or more cells in the system bandwidth. At 704, one or more narrowband measurements at the one or more frequencies can be performed. As described, where the one or more frequencies overlap interference from one or more CSG cells, the interference can be captured in the measurement. At 706, one or more communication metrics of the serving base station can be determined based at least in part on the one or more narrowband measurements. In addition, for example, the one or more narrowband measurements can be combined with one or more additional measurements performed (e.g., a narrowband measurement at a center frequency of the system bandwidth) to determine the communication metrics, as described. In this regard, resources that are potentially interfered with can be included in the measurements so actual interference is captured in the measurements.

Referring to FIG. 8, illustrated is an example methodology 800 for reselecting to a target cell. At 802, it can be determined that RSRP measured at a high priority frequency is greater than a threshold related to reselecting to the frequency. For example, the high priority frequency can be measured as described herein or otherwise. In addition, at 802, it can be determined that the RSRP is greater than the threshold for a period of time. At 804, it can be determined that RSRQ of a target cell operating at the high priority frequency is greater than a threshold related to performing a search. For example, the threshold can relate to performing intra-frequency and/or inter-frequency searches of other cells for reselection, as described. In addition, the thresholds can be received, obtained from hardcoding, specification, or configuration, and/or the like. At 806, the target cell at the high priority frequency can be reselected.

It will be appreciated that, in accordance with one or more aspects described herein, inferences can be made regarding measuring cells, detecting interference in the measurements, computing communication metrics, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
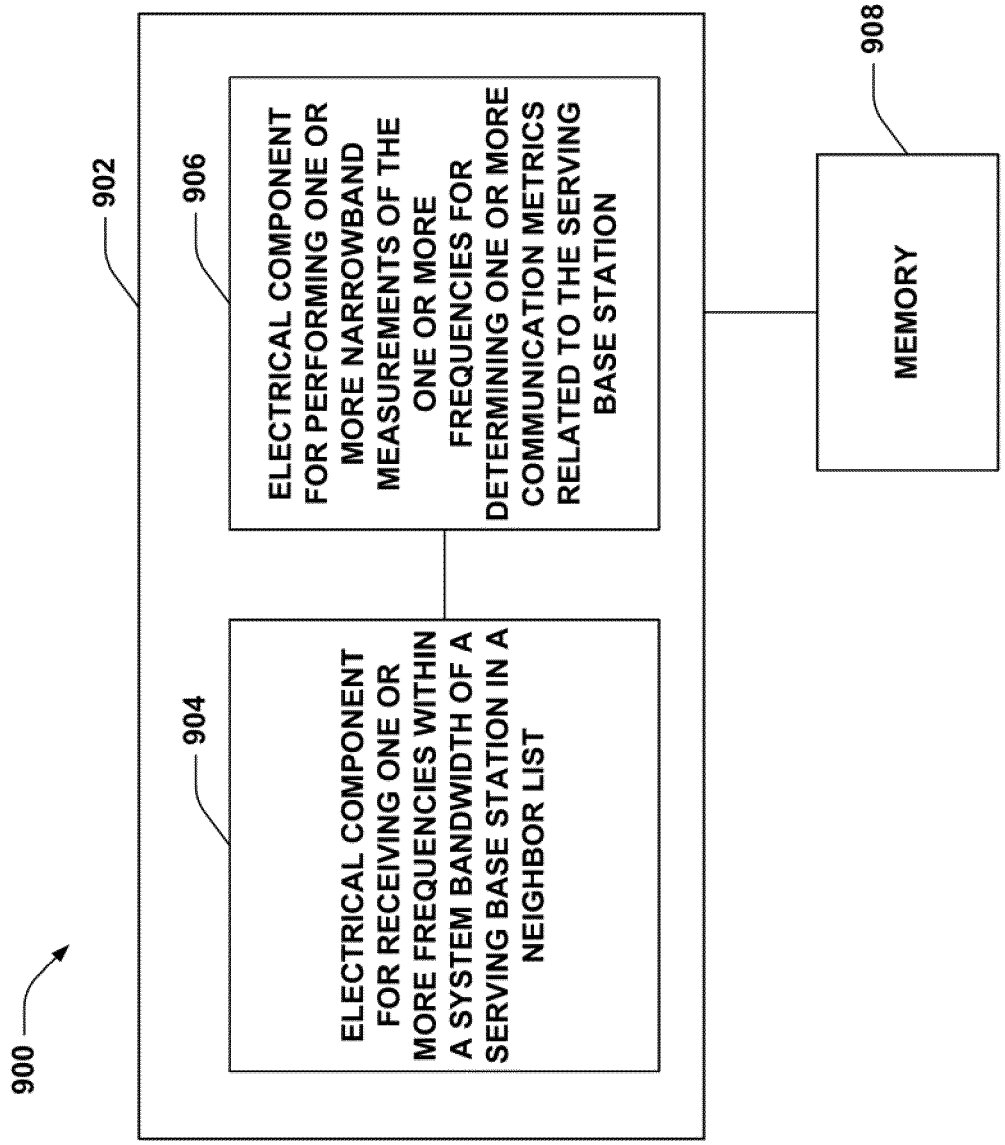
FIG. 9 illustrates an example system for performing measurements over frequencies for cell reselection.

With reference to FIG. 9, illustrated is a system 900 that measures frequencies for cell reselection. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component 904 for receiving one or more frequencies within a system bandwidth of a serving base station in a neighbor list. As described, the one or more frequencies can relate to frequencies having potential interference from one or more CSG cells, etc.

Further, logical grouping 902 can comprise an electrical component 906 for performing one or more narrowband measurements at the one or more frequencies for determining one or more communication metrics related to the serving base station. As described, for example, the one or more communication metrics can be RSRP, RSSI, RSRQ, etc., and can be utilized to determine whether to reselect to another cell, measure other frequencies for reselection, and/or the like.

Moreover, for example, electrical component 904 can be a means for receiving one or more frequencies within a system bandwidth of a serving base station in a neighbor list, and can include a receiver for obtaining a signal from the serving base station comprising the neighbor list, a processor for retrieving the neighbor list from the signal, and/or the like. In one example, electrical component 904 can be a measurement information receiving component 206 (FIG. 2), as described previously. Furthermore, electrical component 906 can be a means for performing one or more narrowband measurements at the one or more frequencies for determining one or more communication metrics related to the serving base station, and can include a receiver that receives signals over the one or more frequencies, a processor that determines the communications metrics of the signals, and/or the like. In one example, electrical component 906 can be a cell measuring component 208 (FIG. 2), as described previously. Additionally, system 900 can include a memory 908 that retains instructions for executing functions associated with the electrical components 904 and 906. While shown as being external to memory 908, it is to be understood that one or more of the electrical components 904 and 906 can exist within memory 908.

Figure 10:
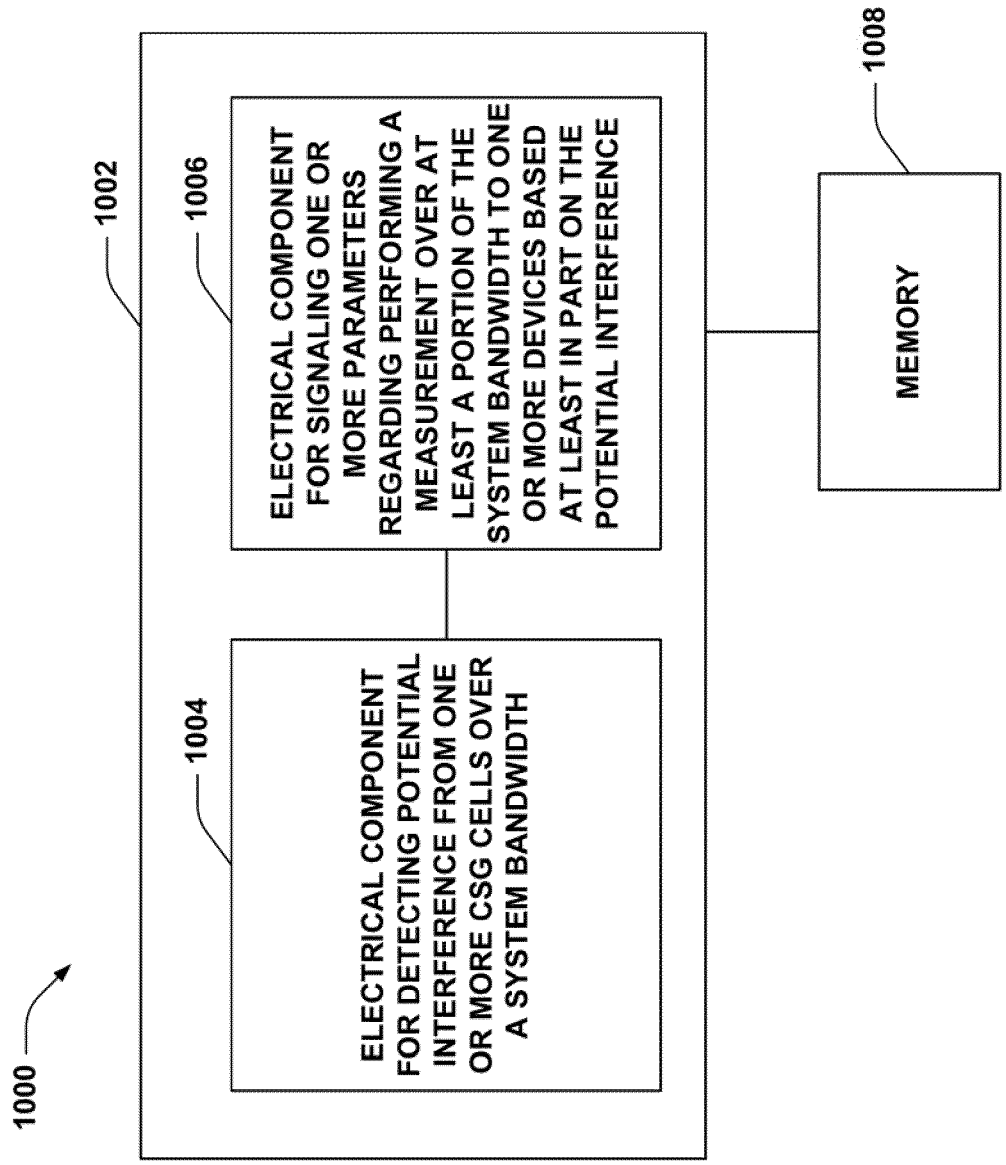
FIG. 10 illustrates an example system for communicating parameters regarding a measurement bandwidth to one or more devices for detecting potential interference over a system bandwidth.

Turning to FIG. 10, illustrated is a system 1000 that provides a measurement bandwidth to one or more devices for measuring potential interference. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component 1004 for detecting potential interference from one or more CSG cells over a system bandwidth. For example, as described, the potential interference can be detected based at least in part on receiving a notification of the CSG cell deployment, which can include a physical location of the CSG cell, a frequency on which the CSG cell operates (which can be at least partially within a frequency of system 1000), and/or the like.

Further, logical grouping 1002 can comprise an electrical component 1006 for signaling one or more parameters regarding performing a measurement over at least a portion of the system bandwidth to one or more devices based at least in part on the potential interference. Thus, as described, the one or more parameters can relate to measuring at least a portion of the system bandwidth utilized by the CSG cell, to allow the one or more devices to measure signals that are potentially interfered with by the CSG cell. As described, the one or more parameters can specify a wideband measurement that includes the CSG cell frequency, one or more narrowband measurements that include the frequency; and/or the like. In an example, as described, the narrowband measurements can be specified in a neighbor list as frequencies within the system bandwidth.

Moreover, for example, electrical component 1004 can be a means for detecting potential interference from one or more CSG cells over a system bandwidth, and can include a receiver that receives signals over the system bandwidth, a processor that measures the signals, and/or the like. In one example, electrical component 1004 can be an interference determining component 202 (FIG. 2), as described. Furthermore, electrical component 1006, in one example, can be a means for signaling one or more parameters regarding performing a measurement over at least a portion of the system bandwidth to one or more devices based at least in part on the potential interference, and can include a processor that creates the signals with the one or more parameters, a transmitter that transmits a signal to the one or more devices, and/or the like. In one example, electrical component 1006 can be a measurement information provisioning component 204 (FIG. 2), as described. Additionally, system 1000 can include a memory 1008 that retains instructions for executing functions associated with the electrical components 1004 and 1006. While shown as being external to memory 1008, it is to be understood that one or more of the electrical components 1004 and 1006 can exist within memory 1008.

Figure 11:
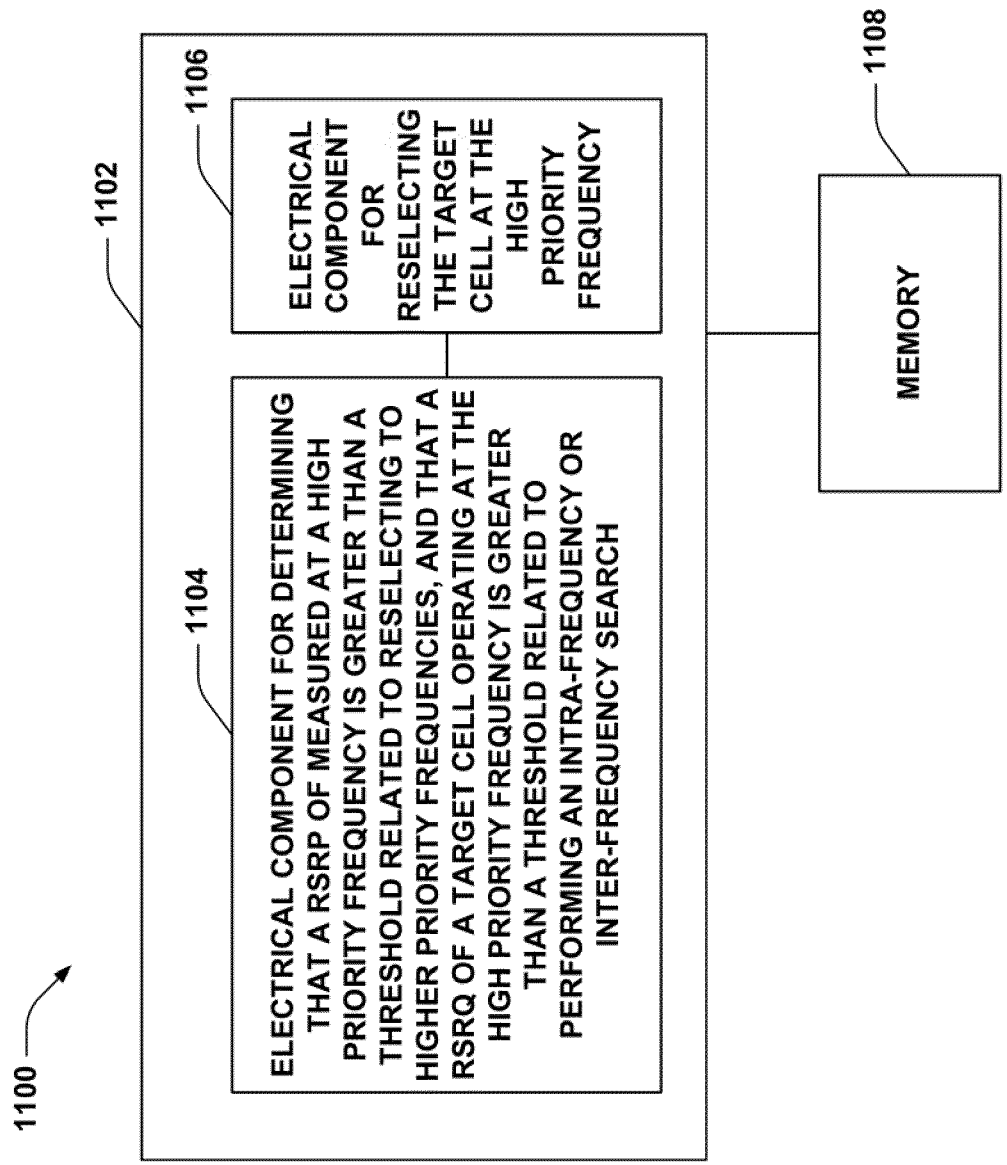
FIG. 11 illustrates an example system that facilitates reselecting to a target cell.

With reference to FIG. 11, illustrated is a system 1100 that reselects to one or more cells. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component 1104 for determining that a RSRP measured at a high priority frequency is greater than a threshold related to reselecting to higher priority frequencies, and that a RSRQ of a target cell operating at the high priority frequency is greater than a threshold related to performing an intra-frequency or inter-frequency search. As described, electrical component 1104 can measure and/or compute the RSRP and RSRQ, and can obtain the threshold values from a hardcoding, specification, configuration, and/or the like. Further, logical grouping 1102 can comprise an electrical component 1106 for reselecting the target cell at the high priority frequency.

Moreover, for example, electrical component 1104 can be a means for determining that a RSRP of a high priority frequency is greater than a threshold related to reselecting to higher priority frequencies, and that a RSRQ of a target cell operating at the high priority frequency is greater than a threshold related to performing an intra-frequency or inter-frequency search, and can include a processor to perform such functions and/or measure RSRP and RSRQ, and/or the like. In one example, electrical component 1104 can be a cell measuring component 208 (FIG. 2), as described. In addition, electrical component 1106 can be a means for reselecting the target cell at the high priority frequency, which can include a processor that determines to reselect to the target cell, a transmitter that transmits a signal to a serving cell to indicate reselection, and/or the like. In one example, electrical component 1106 can be a cell reselecting component 210 (FIG. 2), as described. Additionally, system 1100 can include a memory 1108 that retains instructions for executing functions associated with the electrical components 1104 and 1106. While shown as being external to memory 1108, it is to be understood that one or more of the electrical components 1104 and 1106 can exist within memory 1108.

Figure 12:
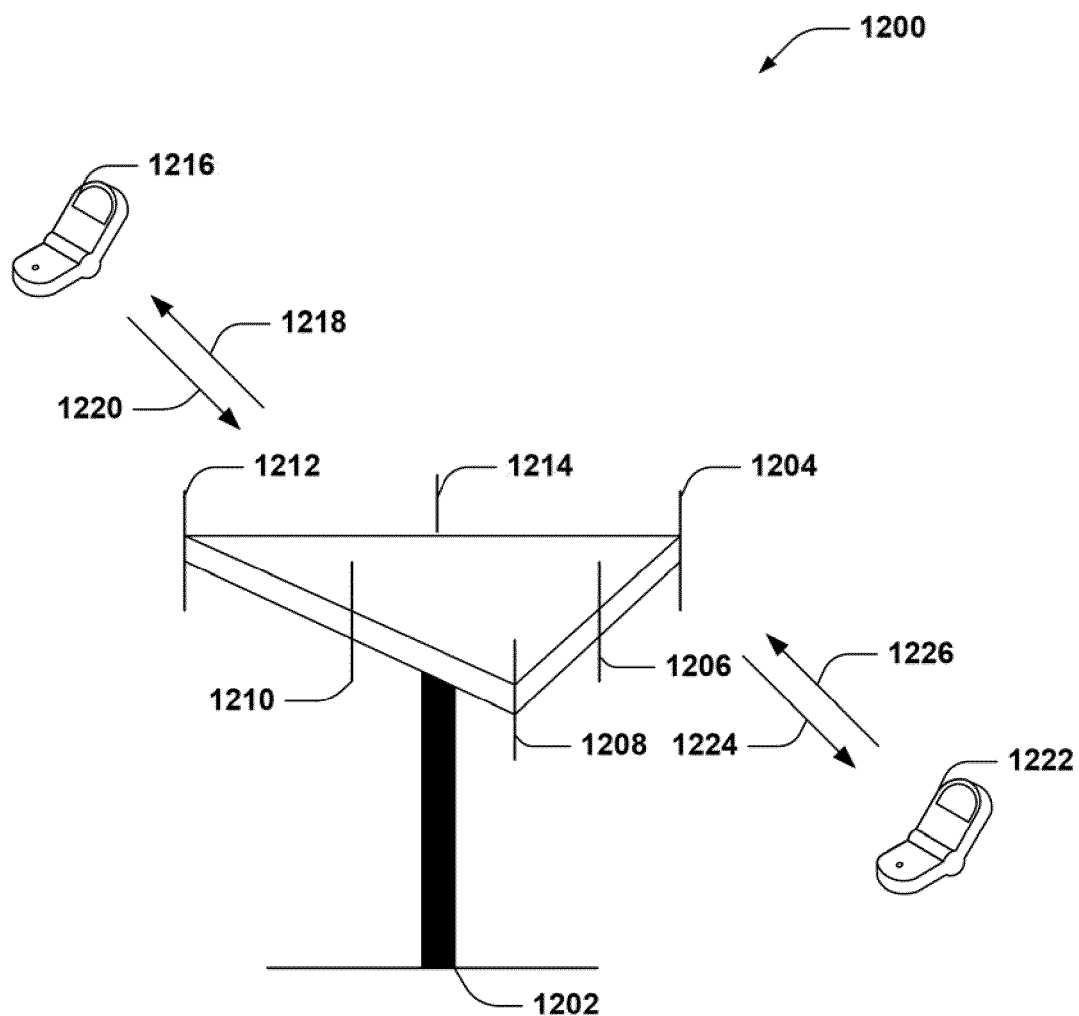
FIG. 12 illustrates a wireless communication system in accordance with various aspects set forth herein.

Referring now to FIG. 12, a wireless communication system 1200 is illustrated in accordance with various embodiments presented herein. System 1200 comprises a base station 1202 that can include multiple antenna groups. For example, one antenna group can include antennas 1204 and 1206, another group can comprise antennas 1208 and 1210, and an additional group can include antennas 1212 and 1214. Two antennas are illustrated for each antenna group; however, more or fewer antennas can be utilized for each group. Base station 1202 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1202 can communicate with one or more mobile devices such as mobile device 1216 and mobile device 1222; however, it is to be appreciated that base station 1202 can communicate with substantially any number of mobile devices similar to mobile devices 1216 and 1222. Mobile devices 1216 and 1222 can be, for example, cellular phones, smart phones, laptops, handheld communication devices, handheld computing devices, satellite radios, global positioning systems, PDAs, and/or any other suitable device for communicating over wireless communication system 1200. As depicted, mobile device 1216 is in communication with antennas 1212 and 1214, where antennas 1212 and 1214 transmit information to mobile device 1216 over a forward link 1218 and receive information from mobile device 1216 over a reverse link 1220. Moreover, mobile device 1222 is in communication with antennas 1204 and 1206, where antennas 1204 and 1206 transmit information to mobile device 1222 over a forward link 1224 and receive information from mobile device 1222 over a reverse link 1226. In a frequency division duplex (FDD) system, forward link 1218 can utilize a different frequency band than that used by reverse link 1220, and forward link 1224 can employ a different frequency band than that employed by reverse link 1226, for example. Further, in a time division duplex (TDD) system, forward link 1218 and reverse link 1220 can utilize a common frequency band and forward link 1224 and reverse link 1226 can utilize a common frequency band.

Each group of antennas and/or the area in which they are designated to communicate can be referred to as a sector of base station 1202. For example, antenna groups can be designed to communicate to mobile devices in a sector of the areas covered by base station 1202. In communication over forward links 1218 and 1224, the transmitting antennas of base station 1202 can utilize beamforming to improve signal-to-noise ratio of forward links 1218 and 1224 for mobile devices 1216 and 1222. Also, while base station 1202 utilizes beamforming to transmit to mobile devices 1216 and 1222 scattered randomly through an associated coverage, mobile devices in neighboring cells can be subject to less interference as compared to a base station transmitting through a single antenna to all its mobile devices. Moreover, mobile devices 1216 and 1222 can communicate directly with one another using a peer-to-peer or ad hoc technology as depicted. According to an example, system 1200 can be a multiple-input multiple-output (MIMO) communication system.

Figure 13:
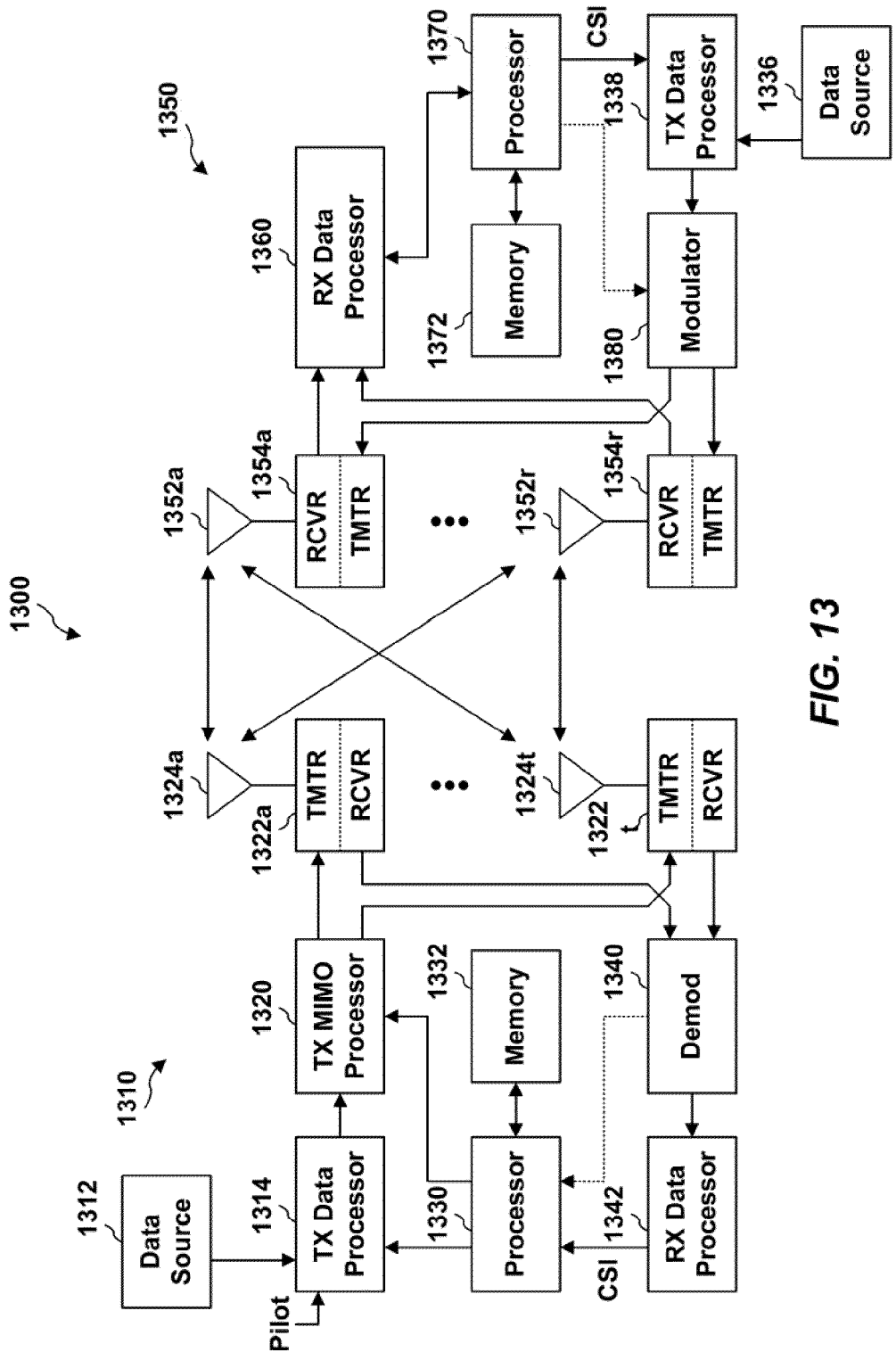
FIG. 13 illustrates an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1, 2, and 9-12), devices (FIGS. 3 and 4), bandwidth portions (FIG. 5), and/or methods (FIGS. 6-8) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At mobile device 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

Figure 14:
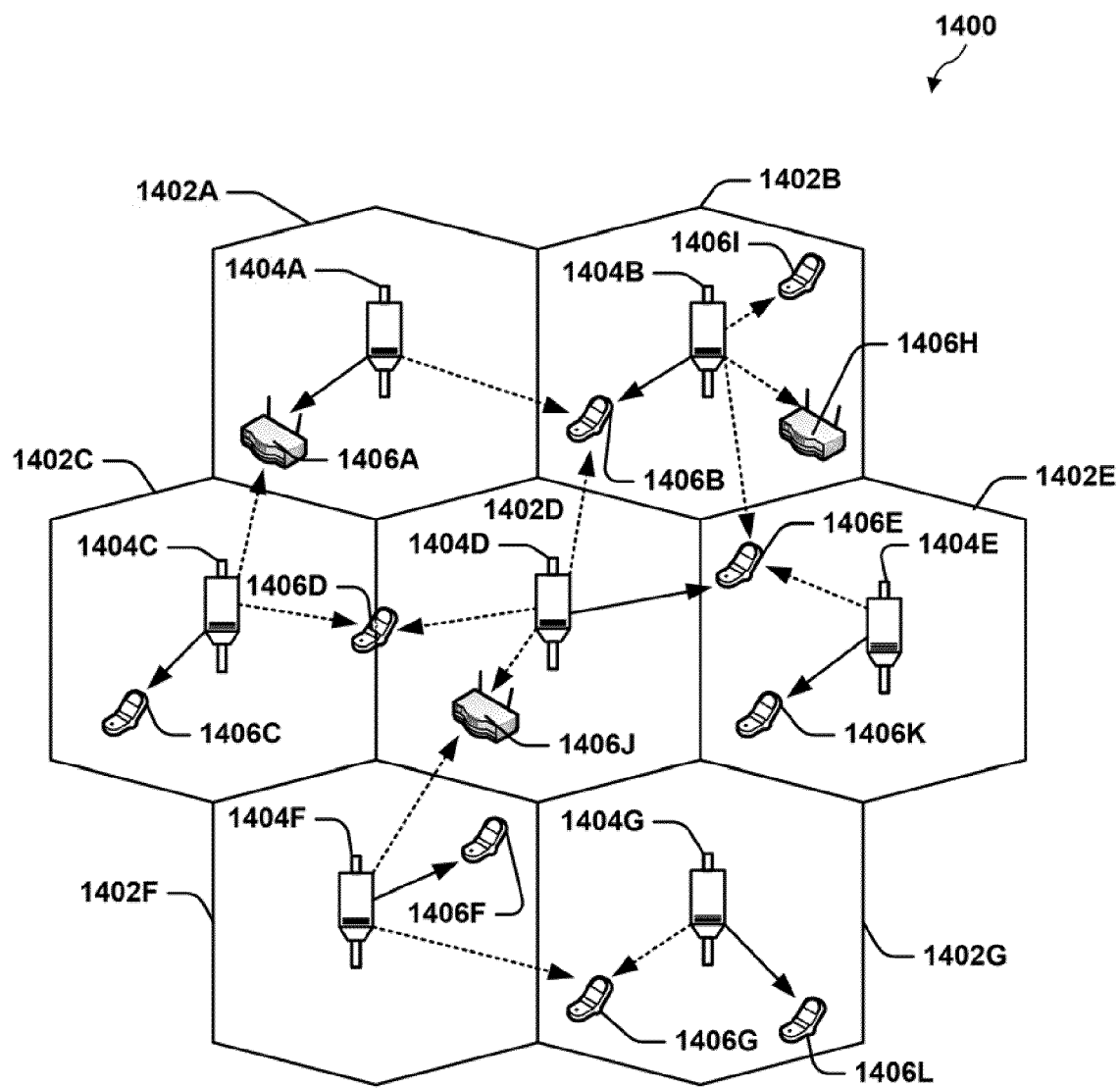
FIG. 14 illustrates a wireless communication system, configured to support a number of devices, in which the aspects herein can be implemented.

FIG. 14 illustrates a wireless communication system 1400, configured to support a number of users, in which the teachings herein may be implemented. The system 1400 provides communication for multiple cells 1402, such as, for example, macro cells 1402A-1402G, with each cell being serviced by a corresponding access node 1404 (e.g., access nodes 1404A-1404G). As shown in FIG. 14, access terminals 1406 (e.g., access terminals 1406A-1406L) can be dispersed at various locations throughout the system over time. Each access terminal 1406 can communicate with one or more access nodes 1404 on a forward link (FL) and/or a reverse link (RL) at a given moment, depending upon whether the access terminal 1406 is active and whether it is in soft handoff, for example. The wireless communication system 1400 can provide service over a large geographic region.

Figure 15:
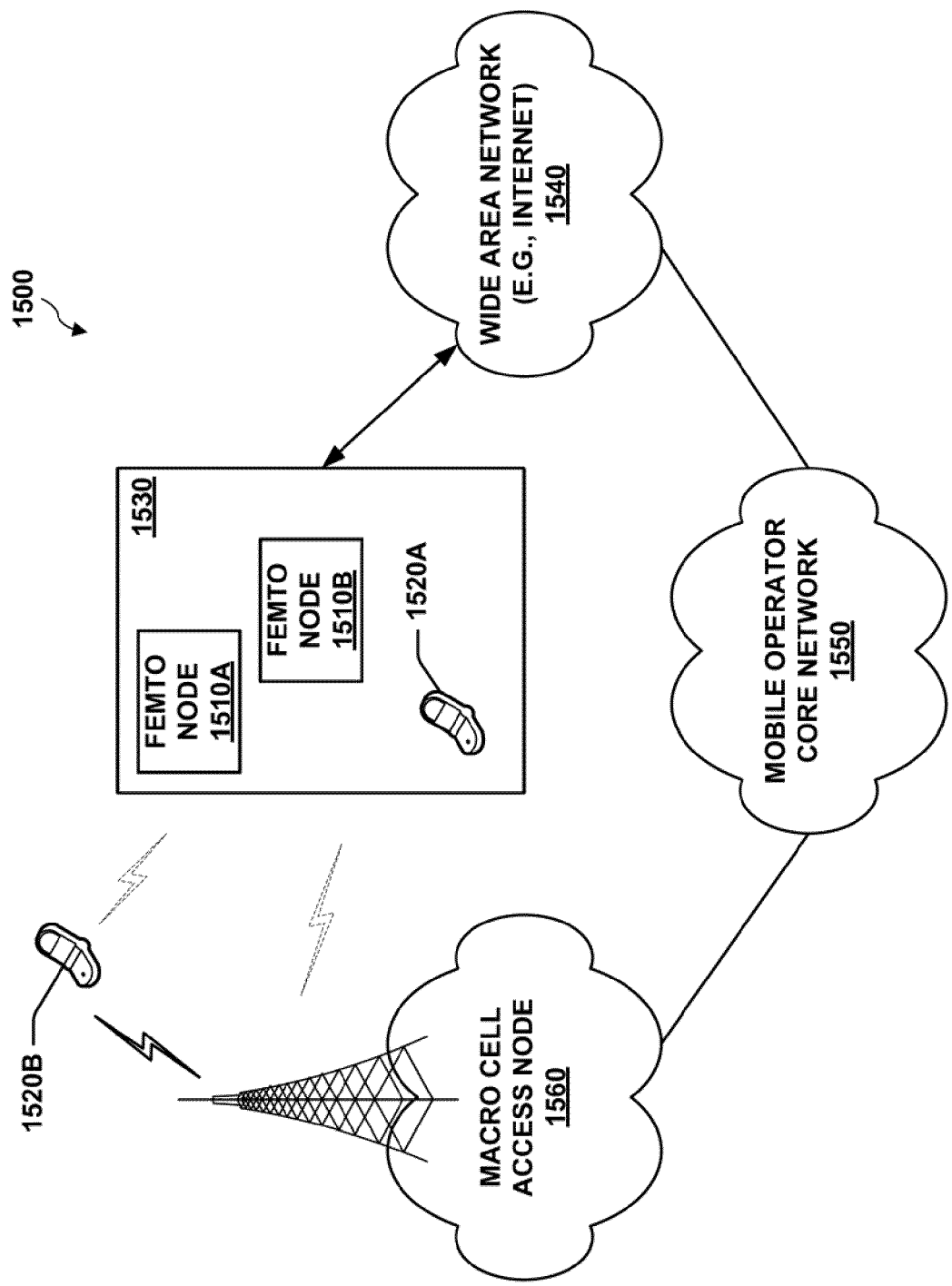
FIG. 15 illustrates an exemplary communication system to enable deployment of femtocells within a network environment.

FIG. 15 illustrates an exemplary communication system 1500 where one or more femto nodes are deployed within a network environment. Specifically, the system 1500 includes multiple femto nodes 1510 (e.g., femto nodes or home Node B (HNB) 1510A and 510B) installed in a relatively small scale network environment (e.g., in one or more user residences 1530). Each femto node 1510 can be coupled to a wide area network 1540 (e.g., the Internet) and a mobile operator core network 1550 via a digital subscriber line (DSL) router, a cable modem, a wireless link, or other connectivity means (not shown). As will be discussed below, each femto node 1510 can be configured to serve associated access terminals 1520 (e.g., access terminal 1520A) and, optionally, alien access terminals 1520 (e.g., access terminal 1520B). In other words, access to femto nodes 1510 can be restricted such that a given access terminal 1520 can be served by a set of designated (e.g., home) femto node(s) 1510 but may not be served by any non-designated femto nodes 1510 (e.g., a neighbor's femto node).

Figure 16:
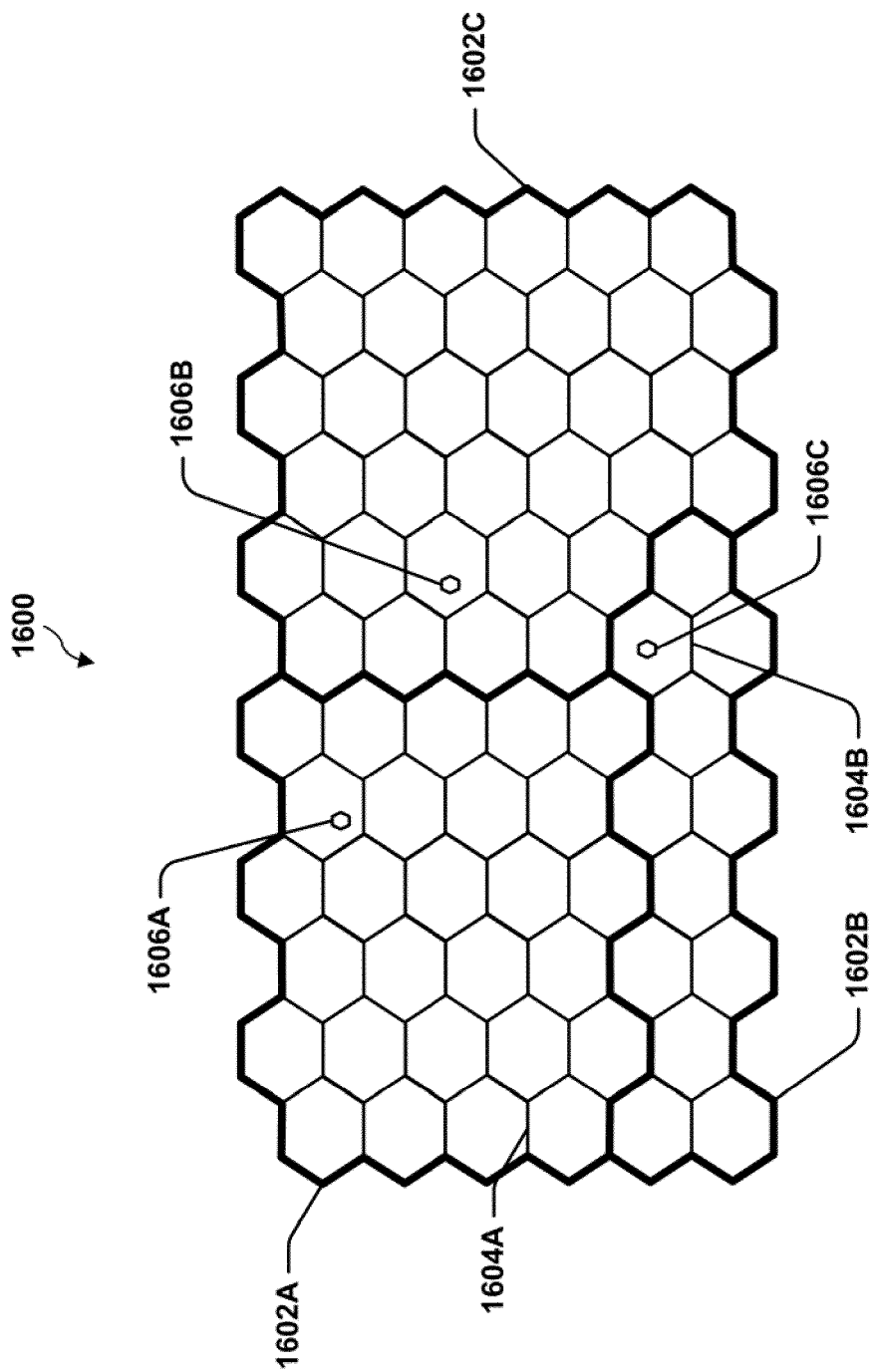
FIG. 16 illustrates an example of a coverage map having several defined tracking areas.

FIG. 16 illustrates an example of a coverage map 1600 where several tracking areas 1602 (or routing areas or location areas) are defined, each of which includes several macro coverage areas 1604. Here, areas of coverage associated with tracking areas 1602A, 1602B, and 1602C are delineated by the wide lines and the macro coverage areas 1604 are represented by the hexagons. The tracking areas 1602 also include femto coverage areas 1606. In this example, each of the femto coverage areas 1606 (e.g., femto coverage area 1606C) is depicted within a macro coverage area 1604 (e.g., macro coverage area 1604B). It should be appreciated, however, that a femto coverage area 1606 may not lie entirely within a macro coverage area 1604. In practice, a large number of femto coverage areas 1606 can be defined with a given tracking area 1602 or macro coverage area 1604. Also, one or more pico coverage areas (not shown) can be defined within a given tracking area 1602 or macro coverage area 1604.

Referring again to FIG. 15, the owner of a femto node 1510 can subscribe to mobile service, such as, for example, 3G mobile service, offered through the mobile operator core network 1550. In addition, an access terminal 1520 can be capable of operating both in macro environments and in smaller scale (e.g., residential) network environments. Thus, for example, depending on the current location of the access terminal 1520, the access terminal 1520 can be served by an access node 1560 or by any one of a set of femto nodes 1510 (e.g., the femto nodes 1510A and 1510B that reside within a corresponding user residence 1530). For example, when a subscriber is outside his home, he is served by a standard macro cell access node (e.g., node 1560) and when the subscriber is at home, he is served by a femto node (e.g., node 1510A). Here, it should be appreciated that a femto node 1510 can be backward compatible with existing access terminals 1520.

A femto node 1510 can be deployed on a single frequency or, in the alternative, on multiple frequencies. Depending on the particular configuration, the single frequency or one or more of the multiple frequencies can overlap with one or more frequencies used by a macro cell access node (e.g., node 1560). In some aspects, an access terminal 1520 can be configured to connect to a preferred femto node (e.g., the home femto node of the access terminal 1520) whenever such connectivity is possible. For example, whenever the access terminal 1520 is within the user's residence 1530, it can communicate with the home femto node 1510.

In some aspects, if the access terminal 1520 operates within the mobile operator core network 1550 but is not residing on its most preferred network (e.g., as defined in a preferred roaming list), the access terminal 1520 can continue to search for the most preferred network (e.g., femto node 1510) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1520 can limit the search for specific band and channel. For example, the search for the most preferred system can be repeated periodically. Upon discovery of a preferred femto node, such as femto node 1510, the access terminal 1520 selects the femto node 1510 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1510 that reside within the corresponding user residence 1530). In some implementations, a femto node can be restricted to not provide, for at least one access terminal, at least one of: signaling, data access, registration, paging, or service.

In some aspects, a restricted femto node (which can also be referred to as a Closed Subscriber Group Home Node B) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, in one example, a non-transitory connection may be termed a computer-readable medium. For example, if software is transmitted from a website, server, or other remote source using a coaxial cable, fiber optic cable, twisted pair, digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication, comprising:
receiving, by a mobile station, one or more frequencies within a system bandwidth of a serving base station in a neighbor list;
performing one or more narrowband measurements of the one or more frequencies;
determining one or more communication metrics of the serving base station based at least in part on the one or more narrowband measurements;
obtaining a reference signal received power (RSRP) of a non-allowed closed subscriber group cell on the one or more frequencies;
determining that the RSRP is greater than that of a serving cell; and
barring a serving frequency of the system bandwidth from measurement for a period of time.

2. The method of claim 1, wherein the one or more frequencies are specified at a higher priority in the neighbor list than the serving frequency of the system bandwidth.

3. The method of claim 2, further comprising performing a different narrowband measurement of a center frequency of the system bandwidth, wherein the determining includes combining the one or more narrowband measurements and the different narrowband measurement to produce a combined reference signal received quality (RSRQ).

4. The method of claim 3, wherein the determining further includes comparing the combined RSRQ to a threshold level related to performing intra-frequency or inter-frequency measurements, reselecting to a higher priority, lower priority, or similar priority frequency as the serving frequency of the system bandwidth, or declaring out-of-service.

5. The method of claim 1, wherein the one or more frequencies are specified at a substantially equal priority in the neighbor list as the serving frequency of the system bandwidth.

6. An apparatus for measuring cells in reselection, comprising:
at least one processor configured to:
obtain one or more frequencies within a system bandwidth of a serving base station in a neighbor list;
perform a narrowband measurement over the one or more frequencies to determine one or more signal properties;
determine one or more communication metrics of the serving base station based at least in part on the one or more signal properties;
obtain a reference signal received power (RSRP) of a non-allowed closed subscriber group cell on the one or more frequencies;
determine that the RSRP is greater than that of a serving cell; and
bar a serving frequency of the system bandwidth from measurement for a period of time; and
a memory coupled to the at least one processor that stores one or more instructions executable by the at least one processor.

7. The apparatus of claim 6, wherein the one or more frequencies are indicated at a higher priority than the serving frequency of the system bandwidth in the neighbor list.

8. The apparatus of claim 7, wherein the at least one processor is further configured to:
perform a narrowband measurement of a center frequency of the system bandwidth;
combine the narrowband measurement and the different narrowband measurement to produce a combined reference signal received quality (RSRQ); and
determine the one or more communication metrics based at least in part on comparing the combined RSRQ to a threshold level related to performing intra-frequency or inter-frequency measurements, reselecting to a higher priority, lower priority, or similar priority frequency as the serving frequency of the system bandwidth, or declaring out-of-service.

9. The apparatus of claim 6, wherein the one or more frequencies are specified at a substantially equal priority in the neighbor list as the serving frequency of the system bandwidth.

10. An apparatus for measuring cells, comprising:
means for receiving one or more frequencies within a system bandwidth of a serving base station in a neighbor list;
means for performing one or more narrowband measurements of the one or more frequencies for determining one or more communication metrics related to the serving base station;
means for obtaining a reference signal received power (RSRP) of a non-allowed closed subscriber group cell on the one or more frequencies;
means for determining that the RSRP is greater than that of a serving cell; and
means for barring a serving frequency of the system bandwidth from measurement for a period of time.

11. The apparatus of claim 10, wherein the one or more frequencies are specified at a higher priority in the neighbor list than the serving frequency of the system bandwidth.

12. The apparatus of claim 11, wherein the means for performing further comprises:
means for performing a different narrowband measurement of a center frequency of the system bandwidth; and
means for combining the one or more narrowband measurements and the different narrowband measurement to produce a combined reference signal received quality.

13. The apparatus of claim 10, wherein the one or more frequencies are specified at a substantially equal priority in the neighbor list as the serving frequency of the system bandwidth.

14. A non-transitory computer program product for measuring cells in reselection, comprising:
a computer-readable medium, comprising:
code for causing at least one computer to obtain one or more frequencies within a system bandwidth of a serving base station in a neighbor list;
code for causing the at least one computer to perform one or more narrowband measurements the one or more frequencies to determine one or more signal properties;
code for causing the at least one computer to determine one or more communication metrics of the serving base station based at least in part on the one or more signal properties;
code for causing the at least one computer to obtain a reference signal received power (RSRP) of a non-allowed closed subscriber group cell on the one or more frequencies;
code for causing the at least one computer to determine that the RSRP is greater than that of a serving cell; and
code for causing the at least one computer to bar a serving frequency of the system bandwidth from measurement for a period of time.

15. An apparatus for measuring cells, comprising:
a measurement information receiving component for obtaining one or more frequencies within a system bandwidth of a serving base station in a neighbor list, and obtaining a reference signal received power (RSRP) of a non-allowed closed subscriber group cell on the one or more frequencies; and
a cell measuring component for performing one or more narrowband measurements of the one or more frequencies for determining one or more communication metrics related to the serving base station, determining that the RSRP is greater than that of a serving cell, and barring a serving frequency of the system bandwidth from measurement for a period of time.

16. The apparatus of claim 15, wherein the one or more frequencies are specified at a higher priority in the neighbor list than the serving frequency of the system bandwidth.

17. The apparatus of claim 16, wherein the cell measuring component further performs a different narrowband measurement of a center frequency of the system bandwidth, and combines the one or more narrowband measurements and the different narrowband measurement to produce a combined reference signal received quality.

18. The apparatus of claim 15, wherein the one or more frequencies are specified at a substantially equal priority in the neighbor list as the serving frequency of the system bandwidth.

* * * * *